(12) United States Patent
Tang et al.

(10) Patent No.: US 8,508,863 B2
(45) Date of Patent: Aug. 13, 2013

(54) IMAGE LENS SYSTEM

(75) Inventors: Hsiang-Chi Tang, Taichung (TW); Po-Lun Hsu, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 49 days.

(21) Appl. No.: 13/415,230

(22) Filed: Mar. 8, 2012

(65) Prior Publication Data

US 2013/0070347 A1    Mar. 21, 2013

(30) Foreign Application Priority Data

Sep. 20, 2011    (TW) .............................. 100133706 A

(51) Int. Cl.
*G02B 13/18*    (2006.01)
*G02B 9/34*    (2006.01)

(52) U.S. Cl.
USPC ......................................... 359/715; 359/773

(58) Field of Classification Search
USPC ................................. 359/715, 773
See application file for complete search history.

(56) References Cited

U.S. PATENT DOCUMENTS

| | | | |
|---|---|---|---|
| 7,184,225 B1 | 2/2007 | Noda | |
| 7,274,518 B1 * | 9/2007 | Tang et al. | 359/772 |
| 7,365,920 B2 | 4/2008 | Noda | |
| 7,453,654 B2 * | 11/2008 | Shinohara | 359/773 |
| 7,920,340 B2 * | 4/2011 | Tang | 359/773 |
| 8,400,717 B2 * | 3/2013 | Chen et al. | 359/715 |
| 2010/0149659 A1 * | 6/2010 | Chen et al. | 359/715 |

* cited by examiner

*Primary Examiner* — Scott J Sugarman
(74) *Attorney, Agent, or Firm* — Morris Manning & Martin LLP; Tim Tingkang Xia, Esq.

(57) ABSTRACT

This invention provides an image lens system comprising: a first lens element with positive refractive power; a second lens element with negative refractive power having a concave object-side surface and a concave image-side surface, both the object-side and image-side surfaces thereof being aspheric and made of plastic; a third lens element with positive refractive power; and a fourth lens element with negative refractive power, and at least one inflection point is formed on at least one of the object-side and image-side surfaces thereof; wherein, the region of the image-side surface of the second lens element near the optical axis is concave, but the off-axis region thereof is convex. By such arrangement, not only the photosensitivity and total track length of the system can be reduced, but also better image quality can be obtained.

22 Claims, 15 Drawing Sheets

IMAGE LENS SYSTEM

CROSS-REFERENCE TO RELATED APPLICATIONS

This non-provisional application claims priority under 35 U.S.C. §119(a) on Patent Application No. 100133706 filed in Taiwan, R.O.C. on Sep. 20, 2011, the entire contents of which are hereby incorporated by reference.

BACKGROUND OF THE INVENTION

1. Field of the Invention

The present invention relates to an image lens system, and more particularly, to a compact image lens system used in electronic products.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional compact imaging lens system equipped on a portable electronic product is often composed of three lens elements such as the lens system set forth in U.S. Pat. No. 7,184,225, comprising, in order from an object side to an image side: a first lens element with positive refractive power, a second lens element with positive refractive power and a third lens element with negative refractive power. Because the progression of manufacturing technology and the trend of being compact for electrical products, the pixel size of sensors is continuously required to be reduced and the demand of the image quality of system is getting higher and higher; therefore, the conventional three-lens-element system can no longer satisfy optical systems of even higher level.

In order to satisfy demands of higher level, a conventional imaging lens system with high resolving power, such as the one set forth in U.S. Pat. No. 7,365,920, generally has a front stop and four lens elements; wherein, the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, because the size of lens system is getting smaller, multiple reflection of unnecessary light in the lens tube is often caused as such compact lens system is configured in such limited space, and the imaging is also affected. Therefore, it is extremely important to well-design the optical configuration to avoid unnecessary light from entering the imaging area. To sum up, a need is continuously existed for a lens system with good image quality and moderate total track length and is suitable for compact and portable electronic products.

SUMMARY OF THE INVENTION

The present invention provides an image lens system, in order from an object side to an image side comprising four lens elements with refractive power: a first lens element with positive refractive power having a convex object-side surface and a convex image-side surface; a second lens element with negative refractive power having a concave object-side surface and a concave image-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein the region of the image-side surface of the second lens element near the optical axis is concave, but the off-axis region thereof is convex; wherein a focal length of the first lens element is f1, a focal length of the fourth lens element is f4, an axial distance between the first lens element and the second lens element is T12, an axial distance between the second lens element and the third lens element is T23, and they satisfy the following relations: $0.6<\text{f1}/|\text{f4}|<1.4$; and $1.0<\text{T12}/\text{T23}<4.5$.

On the other hand, the present invention provides an image lens system, in order from an object side to an image side comprising four lens elements with refractive power: a first lens element with positive refractive power having a convex object-side surface and a convex image-side surface; a second lens element with negative refractive power having a concave object-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein a focal length of the first lens element is f1, a focal length of the fourth lens element is f4, an axial distance between the first lens element and the second lens element is T12, an axial distance between the second lens element and the third lens element is T23, a focal length of the image lens system is f, a focal length of the second lens element is f2, an entrance pupil diameter of the image lens system is EPD, and they satisfy the following relations: $0.6<\text{f1}/|\text{f4}|<1.4$; $1.3<\text{T12}/\text{T23}<4.0$; $-0.9<\text{f}/\text{f2}<-0.4$; and $1.6<\text{f}/\text{EPD}<2.4$.

Furthermore, the present invention provides an image lens system, in order from an object side to an image side comprising four lens elements with refractive power: a first lens element with positive refractive power having a convex object-side surface and a convex image-side surface; a second lens element with negative refractive power having a concave object-side surface and a concave image-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein a focal length of the second lens element is f2, a focal length of the fourth lens element is f4, an axial distance between the first lens element and the second lens element is T12, an axial distance between the second lens element and the third lens element is T23, a curvature radius of the object-side surface of the fourth lens element is R7, a focal length of the image lens system is f, a refractive index of the second lens element is N2, a refractive index of the fourth lens element is N4, and they satisfy the following relations: $0.75 < f2/f4 < 1.5$; $1.0 < T12/T23 < 4.5$; $0.1 < R7/f < 0.8$; and $|N2-N4| < 0.18$.

By such arrangement, not only the photosensitivity and total track length of the system can be reduced, but also better image quality can be obtained.

In the aforementioned image lens system, the first lens element has positive refractive power and thereby can provide significant refractive power needed for the system and is favorable for reducing the total track length thereof. When the second lens element has negative refractive power, the aberration produced by the first lens element with positive refractive power can be effectively corrected. When the third lens element has positive refractive power, the sensitivity reduction of the system can be achieved with respect to the positive refractive power of the first lens element. When the fourth lens element has negative refractive power, the principal point of the system can be positioned away from the image plane so that the total track length of the system can be favorably shortened for keeping the system compact.

In the aforementioned image lens system, the first lens element can be a bi-convex lens element, and thereby the refractive power of the first lens element can be strengthened for reducing the total track length of the system. When the second lens element is a bi-concave lens element, the aberration of the system can be corrected favorably. In addition, when the second lens element has an image-side surface, whose region near the optical axis is concave but the off-axis region thereof is convex, the angle at which light projects onto the image sensor from the off-axis field can be effectively reduced so that the sensing efficiency of the image sensor can be improved and the off-axis aberration can be corrected. Accordingly, the insufficiency of the conventional four-lens-element lens system can be compensated for satisfying the higher demands. When the third lens element has a concave object-side surface and a convex image-side surface, the astigmatism of the system can be favorably corrected. When the fourth lens element has a convex object-side surface and a concave image-side surface, the high order aberration and the astigmatism of the system can be favorably corrected. Furthermore, when at least one inflection is formed on the fourth lens element, the angle at which light projects onto the image sensor from the off-axis field can be effectively reduced so that the sensing efficiency of the image sensor can be improved and the off-axis aberration can be corrected.

DETAILED DESCRIPTION OF THE PREFERRED EMBODIMENTS

Figure 1A:
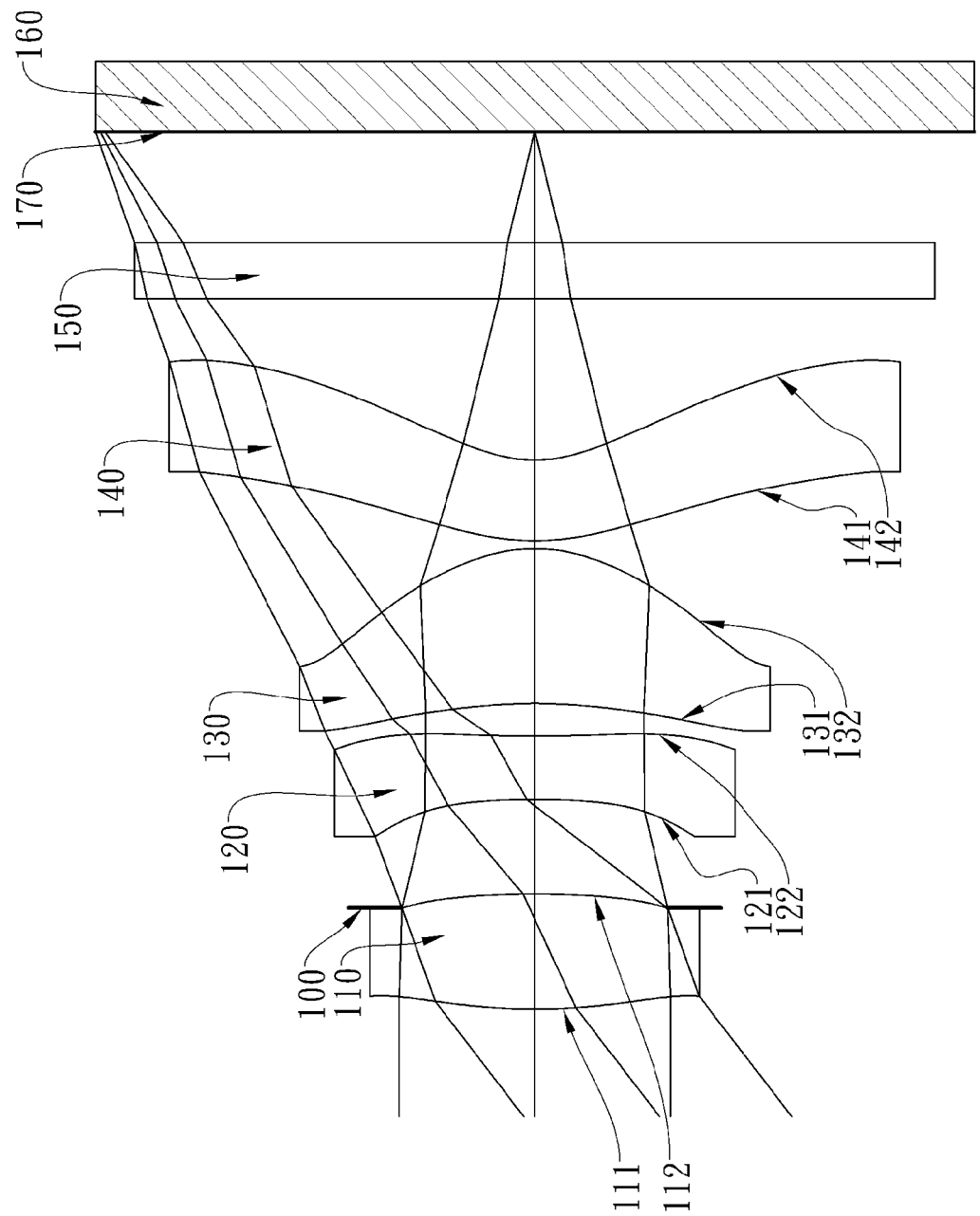
FIG. 1A shows an image lens system in accordance with a first embodiment of the present invention.

The present invention provides an image lens system, in order from an object side to an image side comprising four lens elements with refractive power: a first lens element with positive refractive power having a convex object-side surface and a convex image-side surface; a second lens element with negative refractive power having a concave object-side surface and a concave image-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein the image-side surface of the second lens element is concave, but the peripheral region thereof is convex; wherein a focal length of the first lens element is f1, a focal length of the fourth lens element is f4, an axial distance between the first lens element and the second lens element is T12, an axial distance between the second lens element and the third lens element is T23, and they satisfy the following relations: $0.6 < f1/|f4| < 1.4$; and $1.0 < T12/T23 < 4.5$.

When the relation of $0.6 < f1/|f4| < 1.4$ is satisfied, the distribution of the refractive power of the first lens element and the fourth lens element is more balance, which is favorable for shortening the total track length and reducing the aberration of the system.

When the relation of $1.0 < T12/T23 < 4.5$ is satisfied, the spacing distance between the lens elements is more suitable for reducing the complexity of the assembly of the lens elements. In addition, it also can avoid having an excessively long spacing distance that reduces the size of the lens system. Preferably, the following relation is satisfied: $1.3 < T12/T23 < 4.0$.

In the aforementioned image lens system, a focal length of the image lens system is f, the focal length of the first lens element is f1, and they preferably satisfy the following relation: $0.5 < f/f1 < 1.25$. When the above relation is satisfied, the refractive power of the first lens element is more suitable for shortening the total track length of the system by properly adjusting the refractive power of the first lens element.

In the aforementioned image lens system, a curvature radius of the object-side surface of the second lens element is R3, a curvature radius of the image-side surface of the second lens element is R4, and they preferably satisfy the following relation: $-1.0<(R3+R4)/(R3-R4)<0.5$. When the above relation is satisfied, the curvature of the second lens element is favorable for the correction of the aberration of the system.

In the aforementioned image lens system, a focal length of the second lens element is f2, the focal length of the fourth lens element is f4, and they preferably satisfy the following relation: $0.75<f2/f4<1.5$. When the above relation is satisfied, the negative refractive power of the system can be distributed properly for favorably correcting the aberration and improving image quality of the system.

In the aforementioned image lens system, an Abbe number of the third lens element is V3, an Abbe number of the second lens element is V2, and they preferably satisfy the following relation: $30<V3-V2<42$. When the above relation is satisfied, the chromatic aberration of the system can be favorably corrected.

In the aforementioned image lens system, the system further comprises a stop, an axial distance between the stop and the image-side surface of the fourth lens element is SD, an axial distance between the object-side surface of the first lens element and the image-side surface of the fourth lens element is TD, and they preferably satisfy the following relation: $0.70<SD/TD<0.90$. When the above relation is satisfied, a balance between telecentricity and wide field of view of the system can be obtained.

In the aforementioned image lens system, a horizontal distance between a maximal effective diameter position on the image-side surface of the second lens element and an apex of the image-side surface of the second lens element on the optical axis is SAG22, a central thickness of the second lens element is CT2, and they preferably satisfy the following relation: $-1.5<SAG22/CT2<0$. When the above relation is satisfied, the shape of the second lens element is not excessively bent, which is not only favorable for the manufacturing and the formation of the lens element, but also helpful for reducing the required space for lens elements assembly; therefore, the arrangement of the lens system can be more compact.

In the aforementioned image lens system, a focal length of the image lens system is f, an entrance pupil diameter of the image lens system is EPD, and they preferably satisfy the following relation: $1.6<f/EPD<2.4$. When the above relation is satisfied, sufficient amount of incident light is assured, and thereby the efficiency of the image sensor is improved.

In the aforementioned image lens system, a maximal field of view of the system is FOV, and it preferably satisfies the following relation: 70 degree (deg.)<FOV<90 deg. When the above relation is satisfied, the system can obtain sufficient field of view.

In the aforementioned image lens system, an image sensor is provided on an image plane, a maximal image height of the image lens system is ImgH, which is defined here as half of a diagonal length of an effective photosensitive area of the image sensor; an axial distance between the object-side surface of the first lens element and the image-side surface of the fourth lens element is TD, and they preferably satisfy the following relation: $0.50<ImgH/TD<0.85$. When the above relation is satisfied, it is favorable for keeping the system compact in order to be equipped on portable electronic products.

On the other hand, the present invention provides an image lens system, in order from an object side to an image side comprising four lens elements with refractive power: a first lens element with positive refractive power having a convex object-side surface and a convex image-side surface; a second lens element with negative refractive power having a concave object-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein a focal length of the first lens element is f1, a focal length of the fourth lens element is f4, an axial distance between the first lens element and the second lens element is T12, an axial distance between the second lens element and the third lens element is T23, a focal length of the image lens system is f, a focal length of the second lens element is f2, an entrance pupil diameter of the image lens system is EPD, and they satisfy the following relations: $0.6<f1/|f4|<1.4$; $1.3<T12/T23<4.0$; $-0.9<f/f2<-0.4$; and $1.6<f/EPD<2.4$.

When the relation of $0.6<f1/|f4|<1.4$ is satisfied, the distribution of the refractive power of the first lens element and the fourth lens element is more balance, which is favorable for shortening the total track length and reducing occurrence of the aberration of the system.

When the relation of $1.3<T12/T23<4.0$ is satisfied, the spacing distance between the lens elements is more suitable for reducing the complexity of the assembly of the lens elements. In addition, it also can avoid having an excessively long spacing distance that reduces the size of the lens system.

When the relation of $-0.9<f/f2<-0.4$ is satisfied, the refractive power of the second lens element is more suitable for correcting the aberration of the system favorably.

When the relation of $1.6<f/EPD<2.4$ is satisfied, sufficient amount of incident light is assured, and thereby the efficiency of the image sensor is improved.

In the aforementioned image lens system, an image sensor is provided on an image plane, a maximal image height of the image lens system is ImgH, which is defined here as half of a diagonal length of an effective photosensitive area of the image sensor; an axial distance between the object-side surface of the first lens element and the image-side surface of the fourth lens element is TD, and they preferably satisfy the following relation: $0.50<ImgH/TD<0.85$. When the above relation is satisfied, it is favorable for keeping the system compact in order to be equipped on portable electronic products.

In the aforementioned image lens system, a curvature radius of the object-side surface of the fourth lens element is R7, the focal length of the image lens system is f, and they preferably satisfy the following relation: $0.1<R7/f<0.8$. When the above relation is satisfied, the aberration can be reduced, and the high order aberration produced by the third lens element can be further corrected.

In the aforementioned image lens system, the system further comprises a stop, an axial distance between the stop and the image-side surface of the fourth lens element is SD, an axial distance between the object-side surface of the first lens element and the image-side surface of the fourth lens element is TD, and they preferably satisfy the following relation:

0.70<SD/TD<0.90. When the above relation is satisfied, a balance between telecentricity and wide field of view of the system can be obtained.

Furthermore, the present invention provides an image lens system, in order from an object side to an image side comprising four lens elements with refractive power: a first lens element with positive refractive power having a convex object-side surface and a convex image-side surface; a second lens element with negative refractive power having a concave object-side surface and a concave image-side surface, both the object-side and image-side surfaces thereof being aspheric, and made of plastic; a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof; wherein a focal length of the second lens element is f2, a focal length of the fourth lens element is f4, an axial distance between the first lens element and the second lens element is T12, an axial distance between the second lens element and the third lens element is T23, a curvature radius of the object-side surface of the fourth lens element is R7, a focal length of the image lens system is f, a refractive index of the second lens element is N2, a refractive index of the fourth lens element is N4, and they satisfy the following relations: 0.75<f2/f4<1.5; 1.0<T12/T23<4.5; 0.1<R7/f<0.8; and |N2−N4|<0.18.

When the relation of 0.75<f2/f4<1.5 is satisfied, the negative refractive power of the system can be distributed properly for favorably correcting the aberration and improving image quality of the system.

When the relation of 1.0<T12/T23<4.5 is satisfied, the spacing distance between the lens elements is more suitable for reducing the complexity of the assembly of the lens elements. In addition, it also can avoid having an excessively long spacing distance that reduces the size of the lens system.

When the relation of 0.1<R7/f<0.8 is satisfied, the aberration can be reduced, and the high order aberration produced by the third lens element can be further corrected.

When the relation of |N2−N4|<0.18 is satisfied, a lens material with proper refractive index can be adopted accordingly, which is not only favorable for improving the image quality but also for lowering the costs.

In the aforementioned image lens system, the system further comprises a stop, an axial distance between the stop and the image-side surface of the fourth lens element is SD, an axial distance between the object-side surface of the first lens element and the image-side surface of the fourth lens element is TD, and they preferably satisfy the following relation: 0.70<SD/TD<0.90. When the above relation is satisfied, a balance between telecentricity and wide field of view of the system can be obtained.

In the aforementioned image lens system, an image sensor is provided on an image plane, a maximal image height of the image lens system is ImgH, which is defined here as half of a diagonal length of an effective photosensitive area of the image sensor; an axial distance between the object-side surface of the first lens element and the image-side surface of the fourth lens element is TD, and they preferably satisfy the following relation: 0.50<ImgH/TD<0.85. When the above relation is satisfied, it is favorable for keeping the system compact in order to be equipped on portable electronic products.

In the aforementioned image lens system, a horizontal distance between a maximal effective diameter position on the image-side surface of the second lens element and an apex of the image-side surface of the second lens element on the optical axis is SAG22, a central thickness of the second lens element is CT2, and they preferably satisfy the following relation: −1.5<SAG22/CT2<0. When the above relation is satisfied, the shape of the second lens element is not excessively bent, which is not only favorable for the manufacturing and the formation of the lens element, but also helpful for reducing the required space for lens elements assembly; therefore, the arrangement of the lens system can be more compact.

In the aforementioned image lens system, a focal length of the image lens system is f, an entrance pupil diameter of the image lens system is EPD, and they preferably satisfy the following relation: 1.6<f/EPD<2.4. When the above relation is satisfied, sufficient amount of incident light is assured, and thereby the efficiency of the image sensor is improved.

In the aforementioned image lens system, the lens elements can be made of glass or plastic material. If the lens elements are made of glass, the freedom for distributing the refractive power of the image lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the image lens system can be effectively reduced.

In the present image lens system, there can be at least one stop, such as a glare stop or a field stop, provided for eliminating stray light and thereby promoting image resolution thereof.

In the present image capturing optical system, a stop can be configured as a front stop or a middle-placed stop. A front stop can provide a longer distance between an exit pupil of the system and an image plane and can improve the image-sensing efficiency of an image sensor of CCD or CMOS. A middle-placed stop is favorable for enlarging the field of view of the system and thereby provides a wide field of view for the same.

Figure 8:
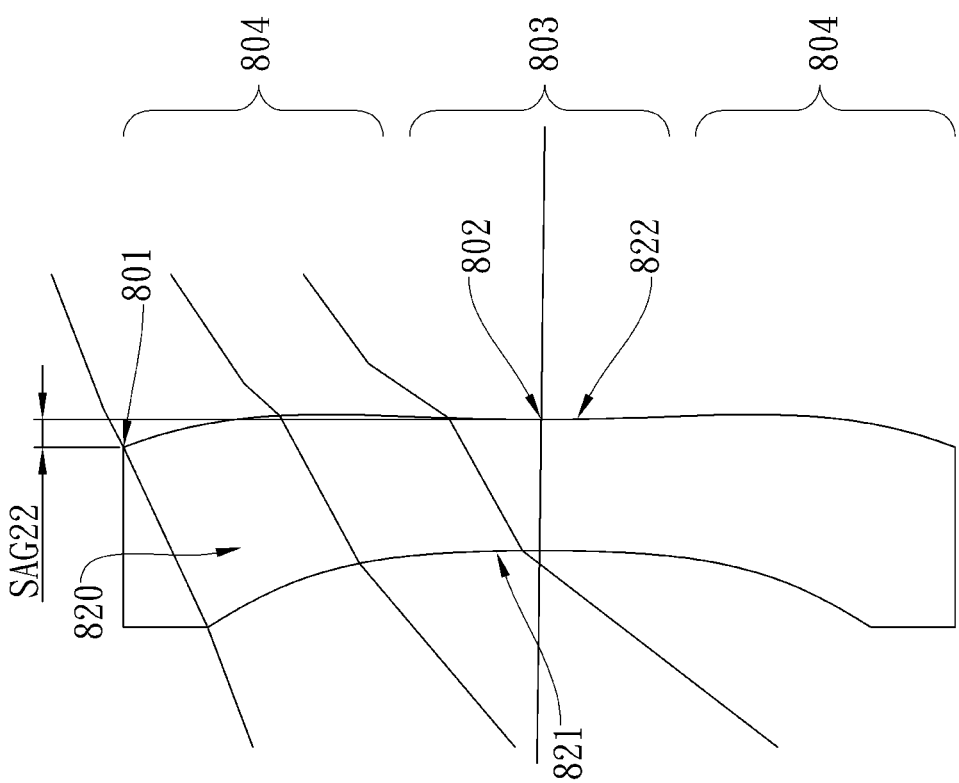
FIG. 8 shows the distance and relevant position represented by SAG22.

In the present image lens system, if a lens element has a convex surface, it means the portion of the surface in proximity to the optical axis is convex; if a lens element has a concave surface, it means the portion of the surface in proximity to the optical axis is concave. Please refer to FIG. 8, the second lens element 820 has a concave object-side surface 821 and a concave image-side surface 822. As mentioned above, the description of that the image-side surface 822 is a concave surface means the region 803 of the image-side surface 822 in proximity to the optical axis is concave. However, it is noted that in this case, the region of the image-side surface 822 away from the optical axis changes from concave to convex. In other words, the off-axis region 804, which is away from the aforesaid region 803 in proximity to the optical axis, is changed to be convex. Furthermore, please refer to FIG. 8 again, a horizontal distance between a maximal effective diameter position 801 on the image-side surface 822 of the second lens element 820 and an apex 802 of the image-side surface 822 of the second lens element 820 on the optical axis is SAG22.

Preferred embodiments of the present invention will be described in the following paragraphs by referring to the accompanying drawings.

Embodiment 1

Figure 1B:
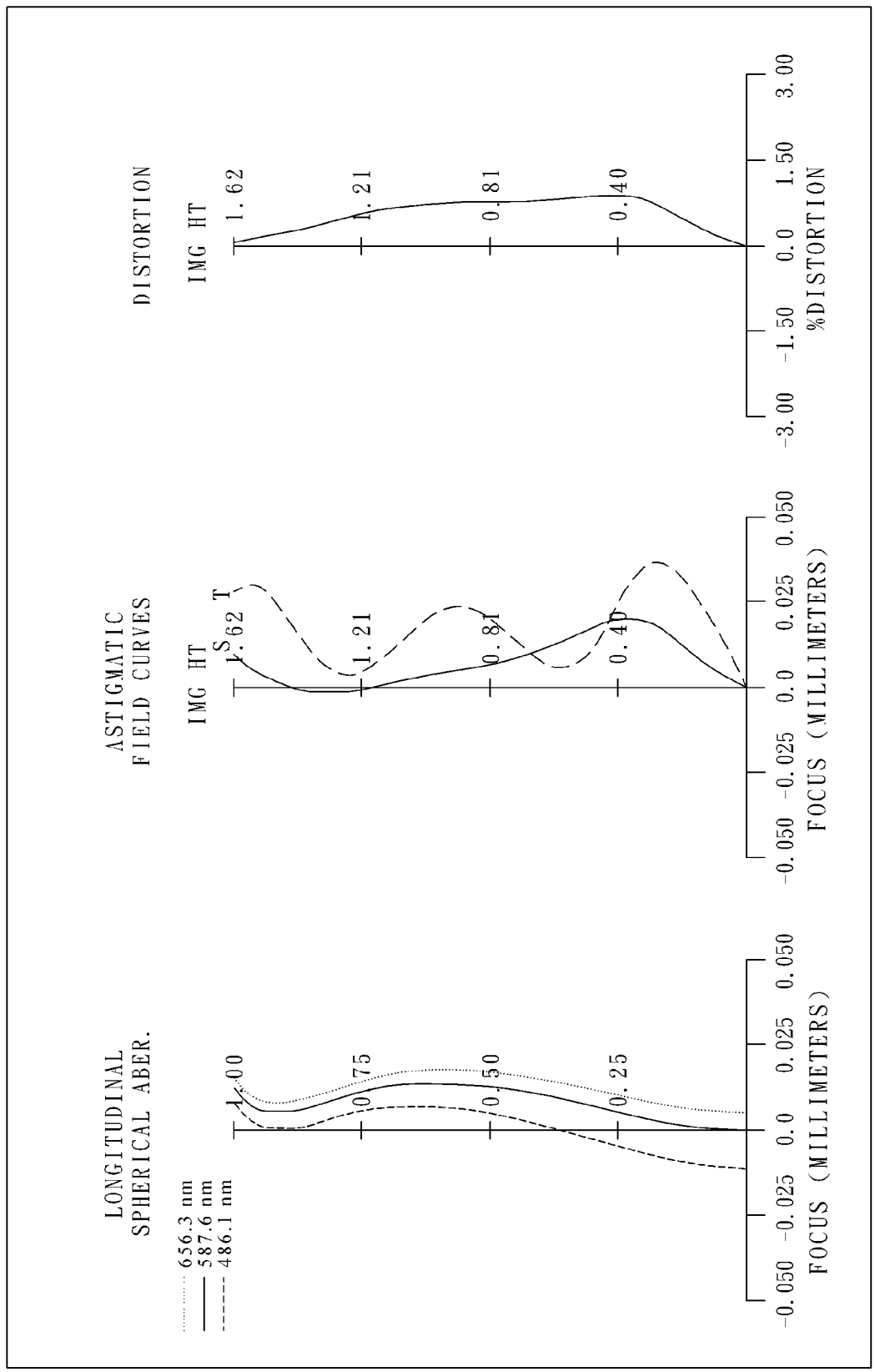
FIG. 1B shows the aberration curves of the first embodiment of the present invention.

FIG. 1A shows an image lens system in accordance with the first embodiment of the present invention, and FIG. 1B shows the aberration curves of the first embodiment of the present invention. The image lens system of the first embodiment of the present invention comprises four lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with negative refractive power having a concave object-side surface 121 and a concave image-side surface 122 near the optical axis, the object-side and image-side surfaces 121 and 122 thereof being aspheric; moreover, the off-axis region of the image-side surface 122 is changed to be convex;

a third lens element 130 made of plastic with positive refractive power having a concave object-side surface 131 and a convex image-side surface 132, the object-side and image-side surfaces 131 and 132 thereof being aspheric; and a fourth lens element 140 made of plastic with negative refractive power having a convex object-side surface 141 and a concave image-side surface 142, the object-side and image-side surfaces 141 and 142 thereof being aspheric, and at least one inflection point is formed on both the object-side surface 141 and the image-side surface 142 thereof;

wherein an aperture stop 100 is disposed between the first lens element 110 and the second lens element 120;

the image lens system further comprises an IR filter 150 disposed between the image-side surface 142 of the fourth lens element 140 and an image plane 170, and the IR filter 150 is made of glass and has no influence on the focal length of the image lens system; the image lens system further comprises an image sensor 160 provided on the image plane 170.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 2.10 mm, Fno = 2.08, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.090040 (ASP) | 0.429 | Plastic | 1.544 | 55.9 | 2.63 |
| 2 | | −4.219300 (ASP) | −0.052 | | | | |
| 3 | Ape. Stop | Plano | 0.404 | | | | |
| 4 | Lens 2 | −3.910300 (ASP) | 0.235 | Plastic | 1.640 | 23.3 | −3.05 |
| 5 | | 3.988300 (ASP) | 0.122 | | | | |
| 6 | Lens 3 | −1.853910 (ASP) | 0.576 | Plastic | 1.544 | 55.9 | 1.38 |
| 7 | | −0.591660 (ASP) | 0.030 | | | | |
| 8 | Lens 4 | 0.863250 (ASP) | 0.300 | Plastic | 1.530 | 55.8 | −2.65 |
| 9 | | 0.470550 (ASP) | 0.600 | | | | |
| 10 | IR-filter | Plano | 0.210 | Glass | 1.516 | 64.1 | — |
| 11 | | Plano | 0.412 | | | | |
| 12 | Image | Plano | — | | | | |

* Reference wavelength is 587.6 nm (d-line)

TABLE 2

Aspheric Coefficients

| Surface # | 1 | 2 | 4 | 5 |
|---|---|---|---|---|
| k = | −2.59683E+00 | −6.06689E+01 | 9.99768E−01 | −9.00000E+01 |
| A4 = | −1.01741E−01 | −4.46680E−01 | −9.06257E−01 | −3.01885E−01 |
| A6 = | −3.92792E−01 | 1.05167E−01 | 1.88816E−01 | −1.13202E−01 |
| A8 = | 4.45851E−01 | −1.15326E+00 | 4.87421E−01 | 1.76693E−01 |
| A10 = | −1.79802E+00 | 1.86827E+00 | −2.36613E−01 | |
| A12 = | | | 3.47449E+00 | |

| Surface # | 6 | 7 | 8 | 9 |
|---|---|---|---|---|
| k = | 4.12616E+00 | −3.99144E+00 | −5.95483E+00 | −3.83631E+00 |
| A4 = | 7.81286E−01 | −8.42936E−01 | −1.56548E−01 | −2.05742E−01 |
| A6 = | −3.84511E+00 | 1.72697E+00 | 1.26107E−01 | 1.87654E−01 |
| A8 = | 1.87228E+01 | −2.13582E+00 | −1.29509E−01 | −1.49695E−01 |
| A10 = | −6.38364E+01 | −4.15782E−01 | 1.36244E−01 | 7.64449E−02 |
| A12 = | 1.34041E+02 | 4.66286E+00 | −8.41948E−02 | −1.92609E−02 |
| A14 = | −1.48720E+02 | −2.78042E+00 | 2.49831E−02 | 3.47360E−04 |
| A16 = | 6.77491E+01 | −3.45853E−01 | −2.71692E−03 | 4.89946E−04 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance of a point on the aspheric surface at a distance Y from the optical axis relative to the tangential plane at the aspheric surface vertex;

Y: the distance from the point on the curve of the aspheric surface to the optical axis;

R: curvature radius k: the conic coefficient;

Ai: the aspheric coefficient of order i.

In the first embodiment of the present image lens system, the focal length of the image lens system is f, and it satisfies the following relation: f=2.10 (mm).

In the first embodiment of the present image lens system, the f-number of the image lens system is Fno, and it satisfies the relation: Fno=2.08.

In the first embodiment of the present image lens system, half of the maximal field of view of the image lens system is HFOV, and it satisfies the relation: HFOV=37.5 deg.

In the first embodiment of the present image lens system, a refractive index of the second lens element 120 is N2, a refractive index of the fourth lens element 140 is N4, and they satisfy the following relation: |N2−N4|=0.11.

In the first embodiment of the present image lens system, an Abbe number of the third lens element 130 is V3, an Abbe number of the second lens element 120 is V2, and they satisfy the following relation: V3−V2=32.6.

In the first embodiment of the present image lens system, an axial distance between the first lens element 110 and the second lens element 120 is T12, an axial distance between the second lens element 120 and the third lens element 130 is T23, and they satisfy the following relation: T12/T23=2.89.

In the first embodiment of the present image lens system, a curvature radius of the object-side surface 121 of the second lens element 120 is R3, a curvature radius of the image-side surface 122 of the second lens element 120 is R4, and they satisfy the following relation: (R3+R4)/(R3−R4)=−0.01.

In the first embodiment of the present image lens system, a curvature radius of the object-side surface 141 of the fourth lens element 140 is R7, the focal length of the image lens system is f, and they satisfy the following relation: R7/f=0.41.

In the first embodiment of the present image lens system, the focal length of the image lens system is f, the focal length of the first lens element 110 is f1, and they satisfy the following relation: f/f1=0.80.

In the first embodiment of the present image lens system, the focal length of the image lens system is f, the focal length of the second lens element 120 is f2, and they satisfy the following relation: f/f2=−0.69.

In the first embodiment of the present image lens system, the focal length of the first lens element 110 is f1, a focal length of the fourth lens element 140 is f4, and they satisfy the following relation: f1/|f4|=0.99.

In the first embodiment of the present image lens system, the focal length of the second lens element 120 is f2, the focal length of the fourth lens element 140 is f4, and they satisfy the following relation: f2/f4=1.15.

In the first embodiment of the present image lens system, a horizontal distance between a maximal effective diameter position on the image-side surface 122 of the second lens element 120 and an apex of the image-side surface 122 of the second lens element 120 on the optical axis is SAG22, a central thickness of the second lens element 120 is CT2, and they satisfy the following relation: SAG22/CT2=−0.21.

In the first embodiment of the present image lens system, a maximal field of view of the system is FOV, and they satisfy the following relation: FOV=75.0 deg.

In the first embodiment of the present image lens system, the focal length of the image lens system is f, an entrance pupil diameter of the image lens system is EPD, and they preferably satisfy the following relation: f/EPD=2.08.

In the first embodiment of the present image lens system, an axial distance between the stop 100 and the image-side surface 142 of the fourth lens element 140 is SD, an axial distance between the object-side surface 111 of the first lens element 110 and the image-side surface 142 of the fourth lens element 140 is TD, and they satisfy the following relation: SD/TD=0.82.

In the first embodiment of the present image lens system, a maximal image height of the image lens system 160 is ImgH, an axial distance between the object-side surface 111 of the first lens element 110 and the image-side surface 142 of the fourth lens element 140 is TD, and they satisfy the following relation: ImgH/TD=0.79.

Embodiment 2

Figure 2A:
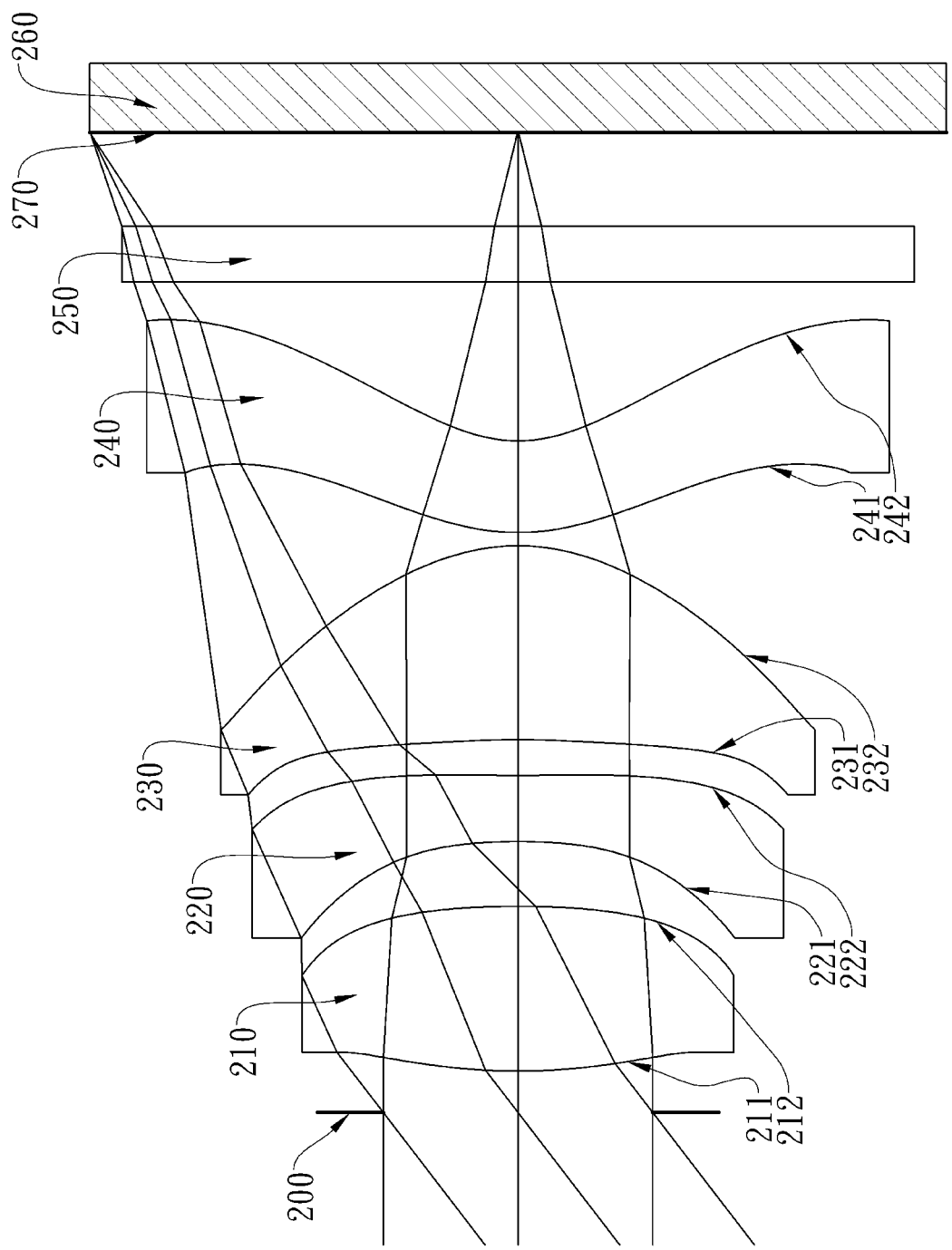
FIG. 2A shows an image lens system in accordance with a second embodiment of the present invention.
Figure 2B:
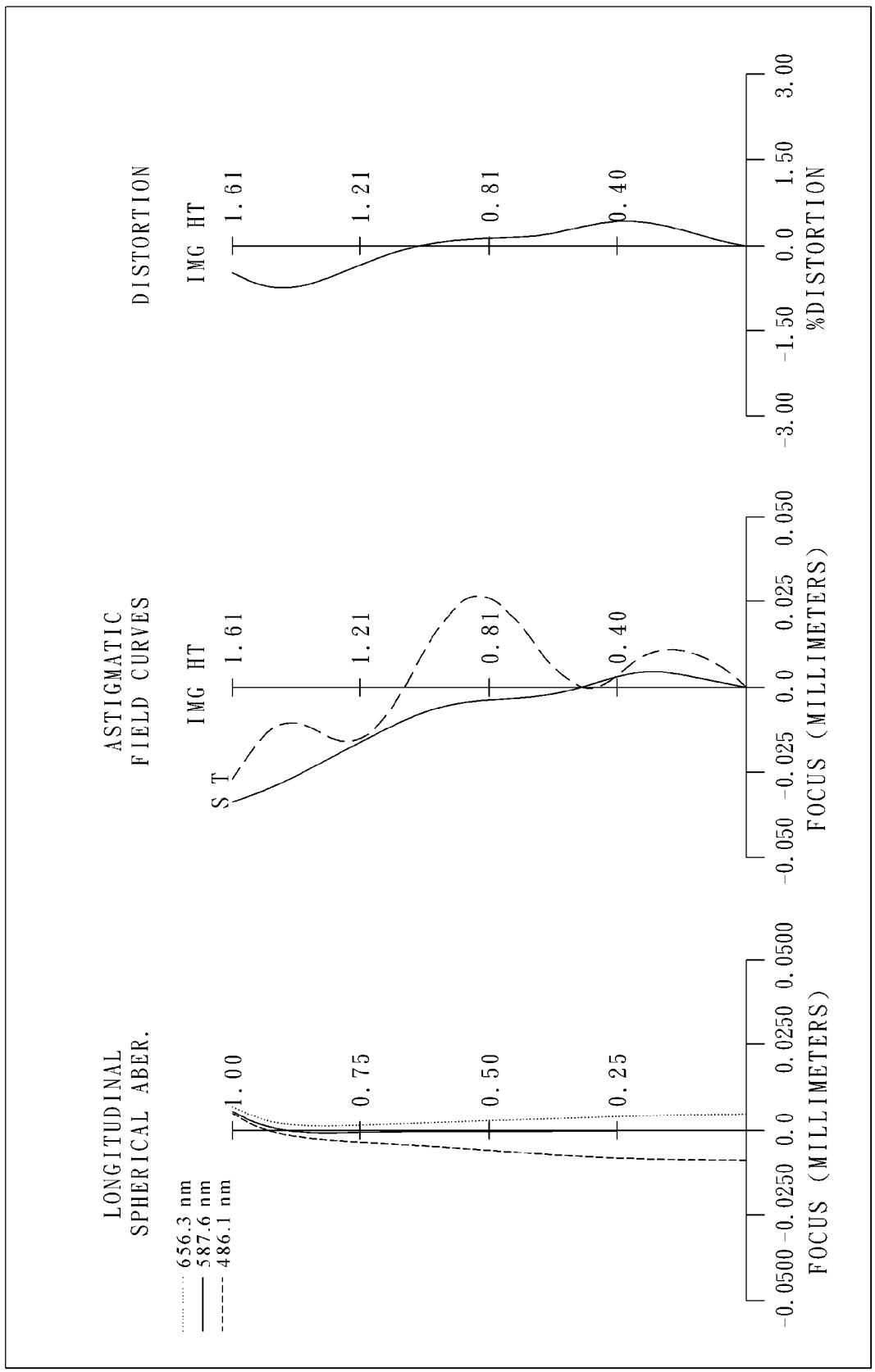
FIG. 2B shows the aberration curves of the second embodiment of the present invention.

FIG. 2A shows an image lens system in accordance with the second embodiment of the present invention, and FIG. 2B shows the aberration curves of the second embodiment of the present invention. The image lens system of the second embodiment of the present invention comprises four lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with negative refractive power having a concave object-side surface 221 and a concave image-side surface 222, the object-side and image-side surfaces 221 and 222 thereof being aspheric; moreover, the off-axis region of the image-side surface 222 is changed to be convex;

a third lens element 230 made of plastic with positive refractive power having a concave object-side surface 231 and a convex image-side surface 232, the object-side and image-side surfaces 231 and 232 thereof being aspheric; and a fourth lens element 240 made of plastic with negative refractive power having a convex object-side surface 241 and a concave image-side surface 242, the object-side and image-side surfaces 241 and 242 thereof being aspheric, and at least one inflection point is formed on both the object-side surface 241 and the image-side surface 242 thereof;

wherein an aperture stop 200 is disposed between an imaged object and the first lens element 210;

the image lens system further comprises an IR filter 250 disposed between the image-side surface 242 of the fourth lens element 240 and an image plane 270, and the IR filter 250 is made of glass and has no influence on the focal length of the image lens system; the image lens system further comprises an image sensor 260 provided on the image plane 270.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.12 mm, Fno = 2.08, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.157 | | | | |
| 2 | Lens 1 | 2.272870 (ASP) | 0.622 | Plastic | 1.544 | 55.9 | 2.68 |
| 3 | | −3.672900 (ASP) | 0.245 | | | | |
| 4 | Lens 2 | −2.327810 (ASP) | 0.250 | Plastic | 1.634 | 23.8 | −3.01 |
| 5 | | 10.973600 (ASP) | 0.135 | | | | |
| 6 | Lens 3 | −3.634400 (ASP) | 0.733 | Plastic | 1.544 | 55.9 | 1.65 |
| 7 | | −0.772030 (ASP) | 0.050 | | | | |
| 8 | Lens 4 | 0.842700 (ASP) | 0.346 | Plastic | 1.634 | 23.8 | −3.65 |
| 9 | | 0.519210 (ASP) | 0.600 | | | | |
| 10 | IR-filter | Plano | 0.210 | Glass | 1.516 | 64.1 | — |
| 11 | | Plano | 0.355 | | | | |
| 12 | Image | Plano | — | | | | |

* Reference wavelength is 587.6 nm (d-line)

TABLE 4

Aspheric Coefficients

| Surface # | 2 | 3 | 4 | 5 |
|---|---|---|---|---|
| k = | 0.00000E+00 | −1.40191E+00 | 4.09866E−01 | −5.47171E+01 |
| A4 = | −5.31573E−02 | −2.31773E−01 | −7.07780E−01 | −3.64348E−01 |
| A6 = | −1.80275E−01 | −2.27075E−01 | 3.80154E−01 | 3.75345E−01 |
| A8 = | 5.24707E−01 | 5.67745E−01 | 1.39501E−01 | −2.23041E−01 |
| A10 = | −1.31565E+00 | −8.71918E−01 | −2.54884E−01 | −9.93561E−02 |
| A12 = | | | −4.38517E−02 | 6.94818E−02 |

| Surface # | 6 | 7 | 8 | 9 |
|---|---|---|---|---|
| k = | −9.10089E+00 | −2.94255E+00 | −2.63680E+00 | −2.66598E+00 |
| A4 = | 4.36703E−01 | −2.09739E−01 | −2.30049E−01 | −1.77880E−01 |
| A6 = | −1.97281E+00 | 5.07209E−02 | 8.36046E−02 | 7.59091E−02 |
| A8 = | 5.87896E+00 | 9.50242E−02 | −6.13183E−03 | 7.31980E−03 |
| A10 = | −1.17273E+01 | −9.04933E−02 | −1.16057E−02 | −5.47812E−02 |
| A12 = | 1.39761E+01 | −1.25490E−02 | −1.71201E−02 | 4.25888E−02 |
| A14 = | −9.15102E+00 | 2.61584E−02 | 2.38498E−02 | −1.40302E−02 |
| A16 = | 2.49313E+00 | | −7.51253E−03 | 1.69933E−03 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

| Embodiment 2 | |
|---|---|
| f | 2.12 |
| FNO | 2.08 |
| HFOV | 37.5 |
| \|N2-N4\| | 0.00 |
| V3-V2 | 32.1 |
| T12/T23 | 1.81 |
| (R3 + R4)/(R3 − R4) | −0.65 |
| R7/f | 0.40 |
| f/f1 | 0.79 |
| f/f2 | −0.70 |
| f1/\|f4\| | 0.73 |
| f2/f4 | 0.82 |
| SAG22/CT2 | −0.81 |
| FOV | 75.0 deg |
| f/EPD | 2.08 |

TABLE 5-continued

| Embodiment 2 | |
|---|---|
| SD/TD | 1.07 |
| ImgH/TD | 0.68 |

Embodiment 3

Figure 3A:
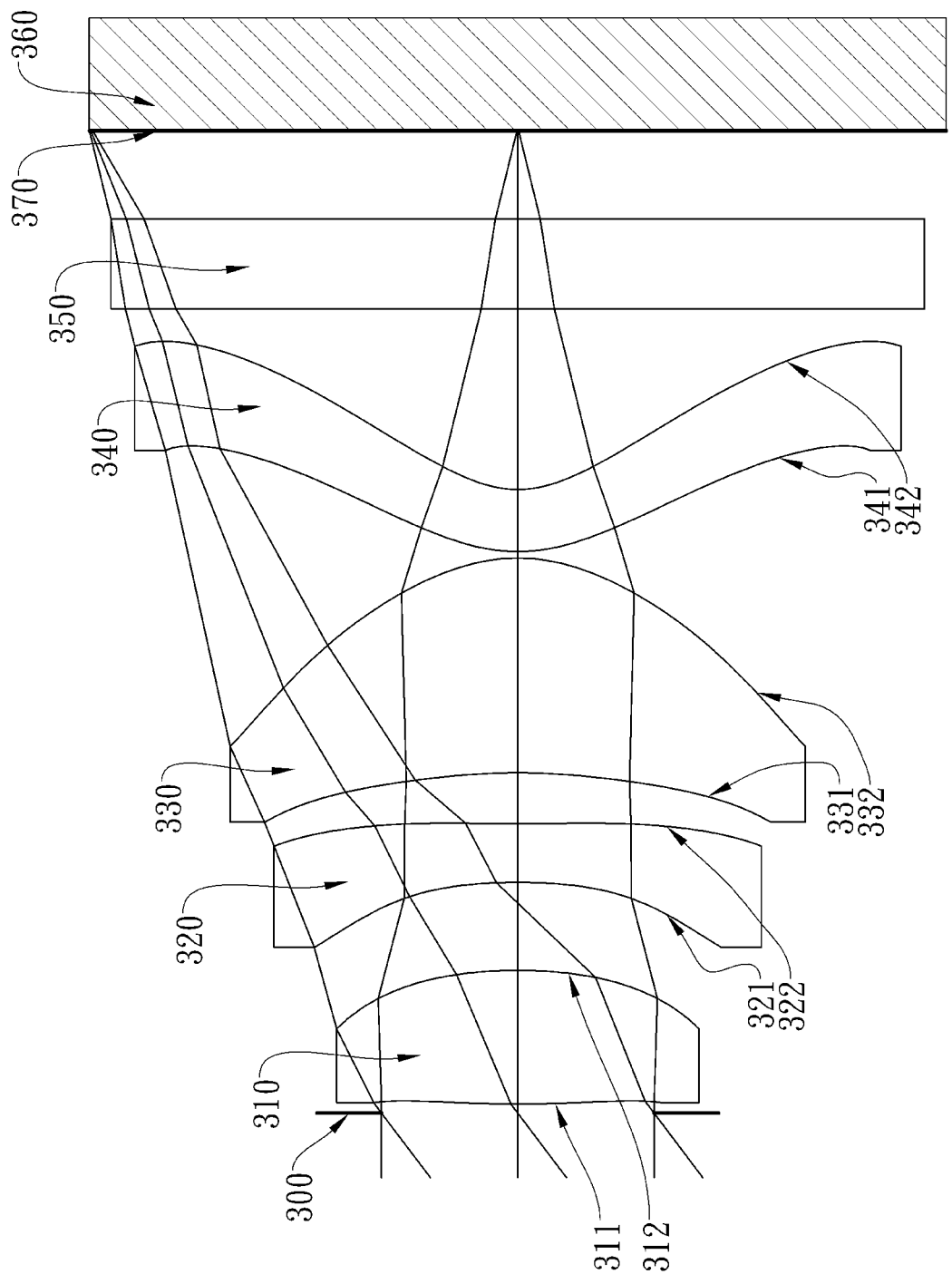
FIG. 3A shows an image lens system in accordance with a third embodiment of the present invention.
Figure 3B:
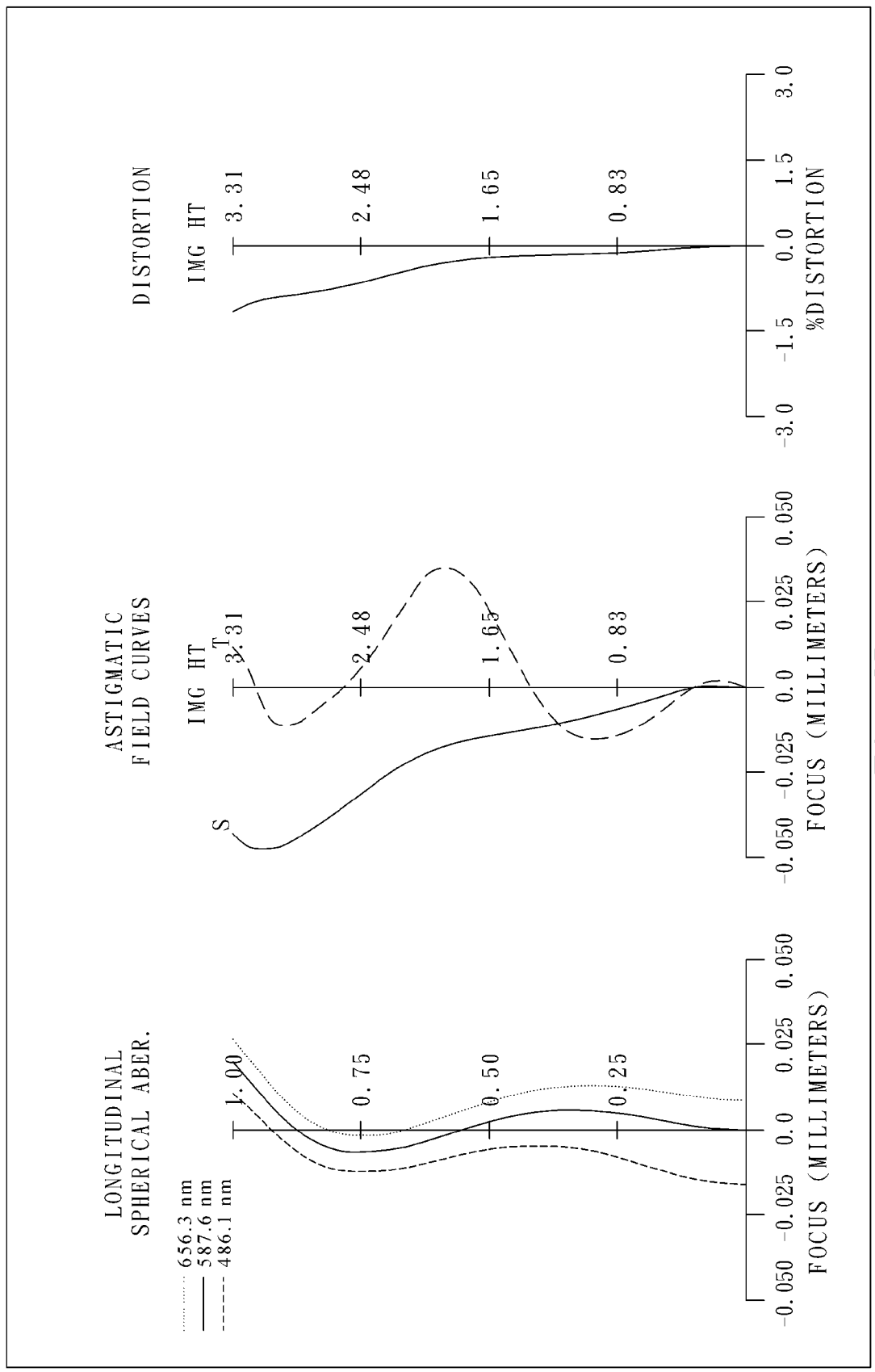
FIG. 3B shows the aberration curves of the third embodiment of the present invention.

FIG. 3A shows an image lens system in accordance with the third embodiment of the present invention, and FIG. 3B shows the aberration curves of the third embodiment of the present invention. The image lens system of the third embodiment of the present invention comprises four lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with negative refractive power having a concave object-side surface 321 and a concave image-side surface 322 near the optical axis, the object-side and image-side surfaces 321 and 322 thereof being aspheric; moreover, the off-axis region of the image-side surface 322 is changed to be convex;

a third lens element 330 made of plastic with positive refractive power having a concave object-side surface 331 and a convex image-side surface 332, the object-side and image-side surfaces 331 and 332 thereof being aspheric; and a fourth lens element 340 made of plastic with negative refractive power having a convex object-side surface 341 and a concave image-side surface 342, the object-side and image-side surfaces 341 and 342 thereof being aspheric, and at least one inflection point is formed on both the object-side surface 341 and the image-side surface 342 thereof;

wherein an aperture stop 300 is disposed between an imaged object and the first lens element 310;

the image lens system further comprises an IR filter 350 disposed between the image-side surface 342 of the fourth lens element 340 and an image plane 370, and the IR filter 350 is made of glass and has no influence on the focal length of the image lens system; the image lens system further comprises an image sensor 360 provided on the image plane 370.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 4.44 mm, Fno = 2.10, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.070 | | | | |
| 2 | Lens 1 | 9.127400 (ASP) | 1.037 | Plastic | 1.544 | 55.9 | 4.91 |
| 3 | | −3.629400 (ASP) | 0.682 | | | | |
| 4 | Lens 2 | −4.633400 (ASP) | 0.456 | Plastic | 1.634 | 23.8 | −6.03 |
| 5 | | 22.621900 (ASP) | 0.395 | | | | |
| 6 | Lens 3 | −4.609800 (ASP) | 1.666 | Plastic | 1.544 | 55.9 | 2.90 |
| 7 | | −1.326170 (ASP) | 0.050 | | | | |
| 8 | Lens 4 | 1.278920 (ASP) | 0.481 | Plastic | 1.634 | 23.8 | −5.19 |
| 9 | | 0.786600 (ASP) | 1.400 | | | | |
| 10 | IR-filter | Plano | 0.700 | Glass | 1.516 | 64.1 | — |
| 11 | | Plano | 0.683 | | | | |
| 12 | Image | Plano | — | | | | |

* Reference wavelength is 587.6 nm (d-line)

TABLE 7

| Aspheric Coefficients | | | | |
|---|---|---|---|---|
| Surface # | 2 | 3 | 4 | 5 |
| k = | 0.00000E+00 | 3.28429E+00 | 2.09348E−01 | −1.00000E+00 |
| A4 = | −2.34803E−02 | −2.52931E−02 | −7.67399E−02 | −4.10318E−02 |
| A6 = | −7.80407E−03 | −4.93669E−03 | 9.87266E−03 | 1.14777E−02 |
| A8 = | 1.35116E−04 | 3.83090E−03 | 5.27745E−03 | −1.37308E−03 |
| A10 = | −2.31293E−03 | −1.27524E−03 | −1.40575E−03 | −1.71500E−04 |
| A12 = | 5.51024E−06 | 3.66454E−05 | 1.22600E−04 | 3.38734E−05 |
| Surface # | 6 | 7 | 8 | 9 |
| k = | −2.32351E+00 | −3.13001E+00 | −3.20157E+00 | −2.70847E+00 |
| A4 = | 4.65780E−02 | −2.80948E−02 | −1.15387E−02 | −1.42644E−02 |
| A6 = | −4.93054E−02 | 1.19639E−03 | −1.10699E−04 | 8.21676E−04 |
| A8 = | 3.42028E−02 | 5.12918E−04 | 1.87186E−04 | 1.74293E−04 |
| A10 = | −1.56986E−02 | −1.11060E−04 | −6.68647E−06 | −7.88799E−05 |
| A12 = | 4.32517E−03 | −1.51884E−06 | −8.57188E−06 | 1.29655E−05 |
| A14 = | −6.53220E−04 | 2.13851E−06 | 1.64471E−06 | −1.02611E−06 |
| A16 = | 4.15254E−05 | | −9.77764E−08 | 3.03722E−08 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

| Embodiment 3 | |
|---|---|
| f | 4.44 |
| FNO | 2.10 |

TABLE 8-continued

Embodiment 3

| | |
|---|---|
| HFOV | 37.1 |
| \|N2-N4\| | 0.00 |
| V3-V2 | 32.1 |
| T12/T23 | 1.73 |
| (R3 + R4)/(R3 − R4) | −0.66 |
| R7/f | 0.29 |
| f/f1 | 0.90 |
| f/f2 | −0.74 |
| f1/\|f4\| | 0.95 |
| f2/f4 | 1.16 |
| SAG22/CT2 | −0.38 |
| FOV | 74.2 deg |
| f/EPD | 2.10 |
| SD/TD | 1.02 |
| ImgH/TD | 0.69 |

Embodiment 4

Figure 4A:
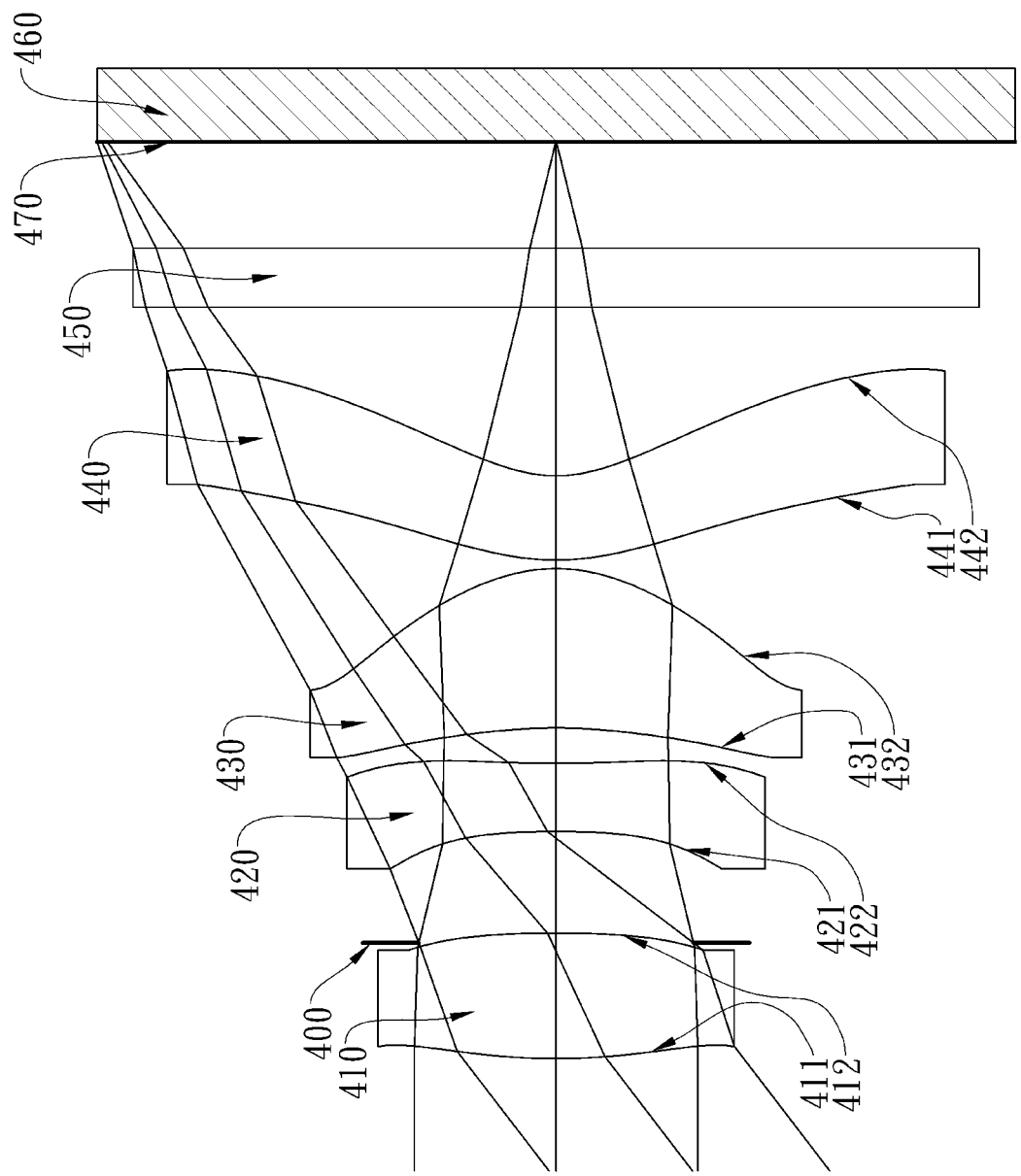
FIG. 4A shows an image lens system in accordance with a fourth embodiment of the present invention.
Figure 4B:
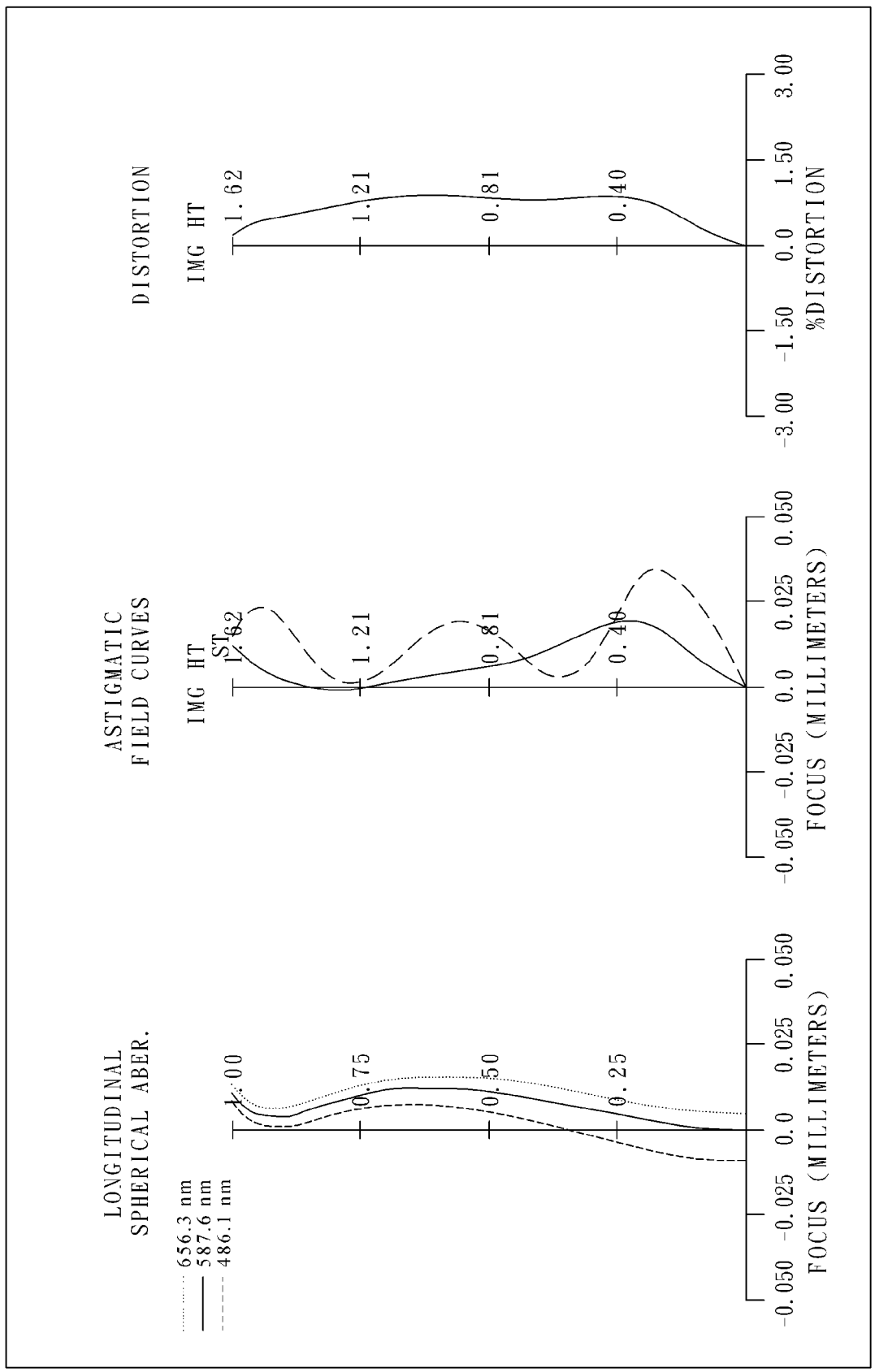
FIG. 4B shows the aberration curves of the fourth embodiment of the present invention.

FIG. 4A shows an image lens system in accordance with the fourth embodiment of the present invention, and FIG. 4B shows the aberration curves of the fourth embodiment of the present invention. The image lens system of the fourth embodiment of the present invention comprises four lens elements, in order from an object side to an image side:

a first lens element 410 made of glass with positive refractive power having a convex object-side surface 411 and a convex image-side surface 412, the object-side and image-side surfaces 411 and 412 thereof being aspheric;

a second lens element 420 made of plastic with negative refractive power having a concave object-side surface 421 and a concave image-side surface 422 near the optical axis, the object-side and image-side surfaces 421 and 422 thereof being aspheric; moreover, the off-axis region of the image-side surface 422 is changed to be convex;

a third lens element 430 made of plastic with positive refractive power having a concave object-side surface 431 and a convex image-side surface 432, the object-side and image-side surfaces 431 and 432 thereof being aspheric; and a fourth lens element 440 made of plastic with negative refractive power having a convex object-side surface 441 and a concave image-side surface 442, the object-side and image-side surfaces 441 and 442 thereof being aspheric, and at least one inflection point is formed on both the object-side surface 441 and the image-side surface 442 thereof;

wherein an aperture stop 400 is disposed between the first lens element 410 and the second lens element 420;

the image lens system further comprises an IR filter 450 disposed between the image-side surface 442 of the fourth lens element 440 and an image plane 470, and the IR filter 450 is made of glass and has no influence on the focal length of the image lens system; the image lens system further comprises an image sensor 460 provided on the image plane 470.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 2.10 mm, Fno = 2.08, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.171770 (ASP) | 0.447 | Glass | 1.566 | 61.1 | 2.60 |
| 2 | | −4.225200 (ASP) | −0.035 | | | | |
| 3 | Ape. Stop | Plano | 0.396 | | | | |
| 4 | Lens 2 | −4.029400 (ASP) | 0.243 | Plastic | 1.640 | 23.3 | −3.05 |
| 5 | | 3.867800 (ASP) | 0.126 | | | | |
| 6 | Lens 3 | −1.855400 (ASP) | 0.568 | Plastic | 1.544 | 55.9 | 1.37 |
| 7 | | −0.588180 (ASP) | 0.030 | | | | |
| 8 | Lens 4 | 0.863210 (ASP) | 0.300 | Plastic | 1.544 | 55.9 | −2.57 |
| 9 | | 0.468450 (ASP) | 0.600 | | | | |
| 10 | IR-filter | Plano | 0.210 | Glass | 1.516 | 64.1 | — |
| 11 | | Plano | 0.379 | | | | |
| 12 | Image | Plano | — | | | | |

*Reference wavelength is 587.6 nm (d-line)

TABLE 10

Aspheric Coefficients

| Surface # | 1 | 2 | 4 | 5 |
|---|---|---|---|---|
| k = | −2.57005E+00 | −6.00293E+01 | 1.00000E+00 | −9.00000E+01 |
| A4 = | −1.01332E−01 | −4.42145E−01 | −9.13910E−01 | −3.05534E−01 |
| A6 = | −3.91465E−01 | 1.28401E−01 | 2.36973E−01 | −1.09835E−01 |
| A8 = | 4.52825E−01 | −1.14462E+00 | 5.16425E−01 | 1.75254E−01 |
| A10 = | −1.57154E+00 | 1.94223E+00 | −4.32059E−01 | |
| A12 = | | 3.47461E+00 | | |

| Surface # | 6 | 7 | 8 | 9 |
|---|---|---|---|---|
| k = | 4.14981E+00 | −3.98639E+00 | −6.07692E+00 | −3.89148E+00 |
| A4 = | 7.76091E−01 | −8.35500E−01 | −1.51460E−01 | −1.99803E−01 |

TABLE 10-continued

| Aspheric Coefficients | | | | |
|---|---|---|---|---|
| A6 = | −3.85483E+00 | 1.72886E+00 | 1.25576E−01 | 1.84935E−01 |
| A8 = | 1.87193E+01 | −2.13430E+00 | −1.30397E−01 | −1.48683E−01 |
| A10 = | −6.38267E+01 | −4.14673E−01 | 1.37060E−01 | 7.62721E−02 |
| A12 = | 1.34058E+02 | 4.65982E+00 | −8.38610E−02 | −1.90963E−02 |
| A14 = | −1.48699E+02 | −2.78454E+00 | 2.49865E−02 | 3.84199E−04 |
| A16 = | 6.77412E+01 | −3.43171E−01 | −2.82208E−03 | 4.45890E−04 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

| Embodiment 4 | |
|---|---|
| f | 2.10 |
| FNO | 2.08 |
| HFOV | 37.5 |
| |N2-N4| | 0.10 |
| V3-V2 | 32.6 |
| T12/T23 | 2.87 |
| (R3 + R4)/(R3 − R4) | 0.02 |
| R7/f | 0.41 |
| f/f1 | 0.81 |
| f/f2 | −0.69 |
| f1/|f4| | 1.01 |
| f2/f4 | 1.19 |
| SAG22/CT2 | −0.20 |
| FOV | 75.0 deg |
| f/EPD | 2.08 |
| SD/TD | 0.80 |
| ImgH/TD | 0.78 |

Embodiment 5

Figure 5A:
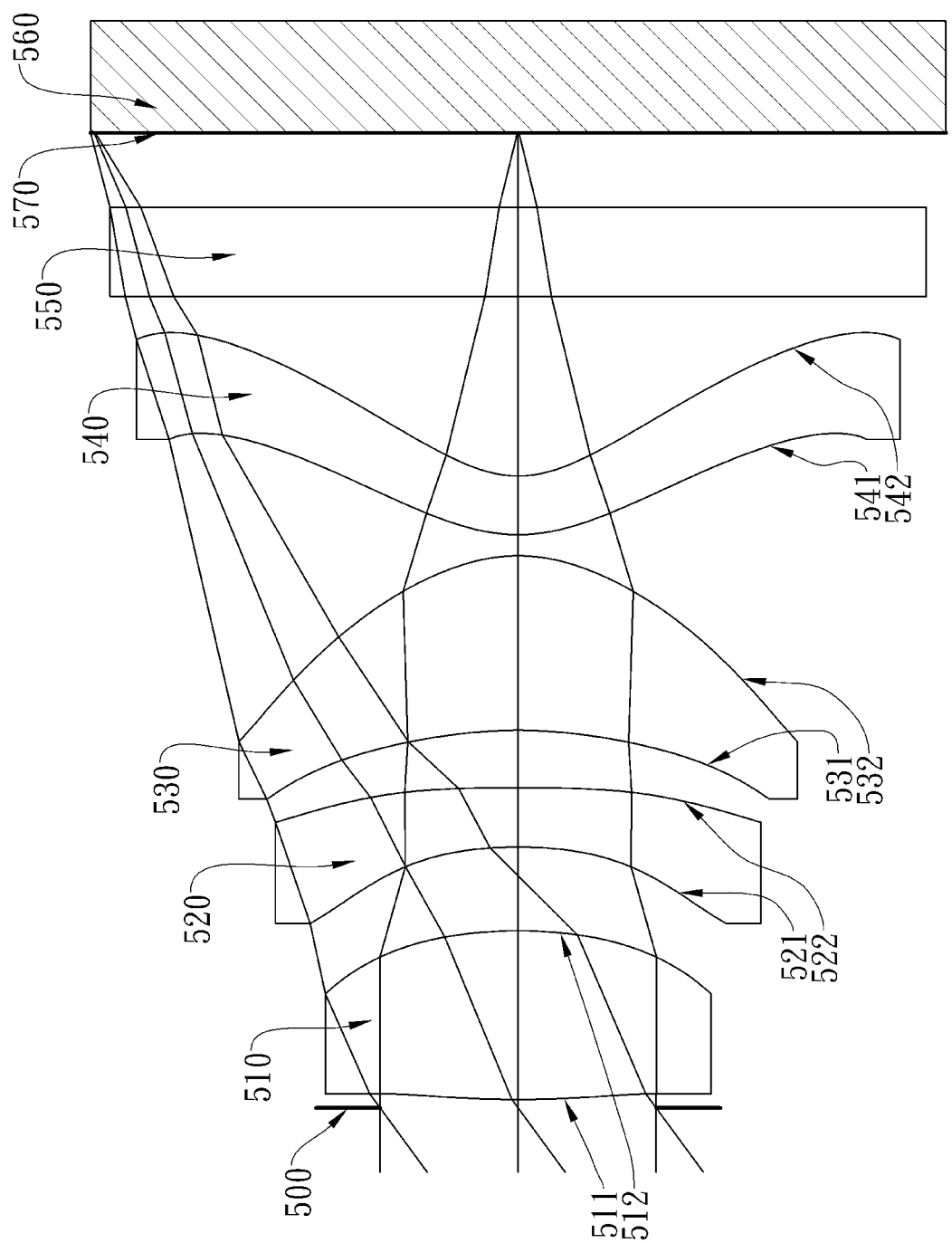
FIG. 5A shows an image lens system in accordance with a fifth embodiment of the present invention.
Figure 5B:
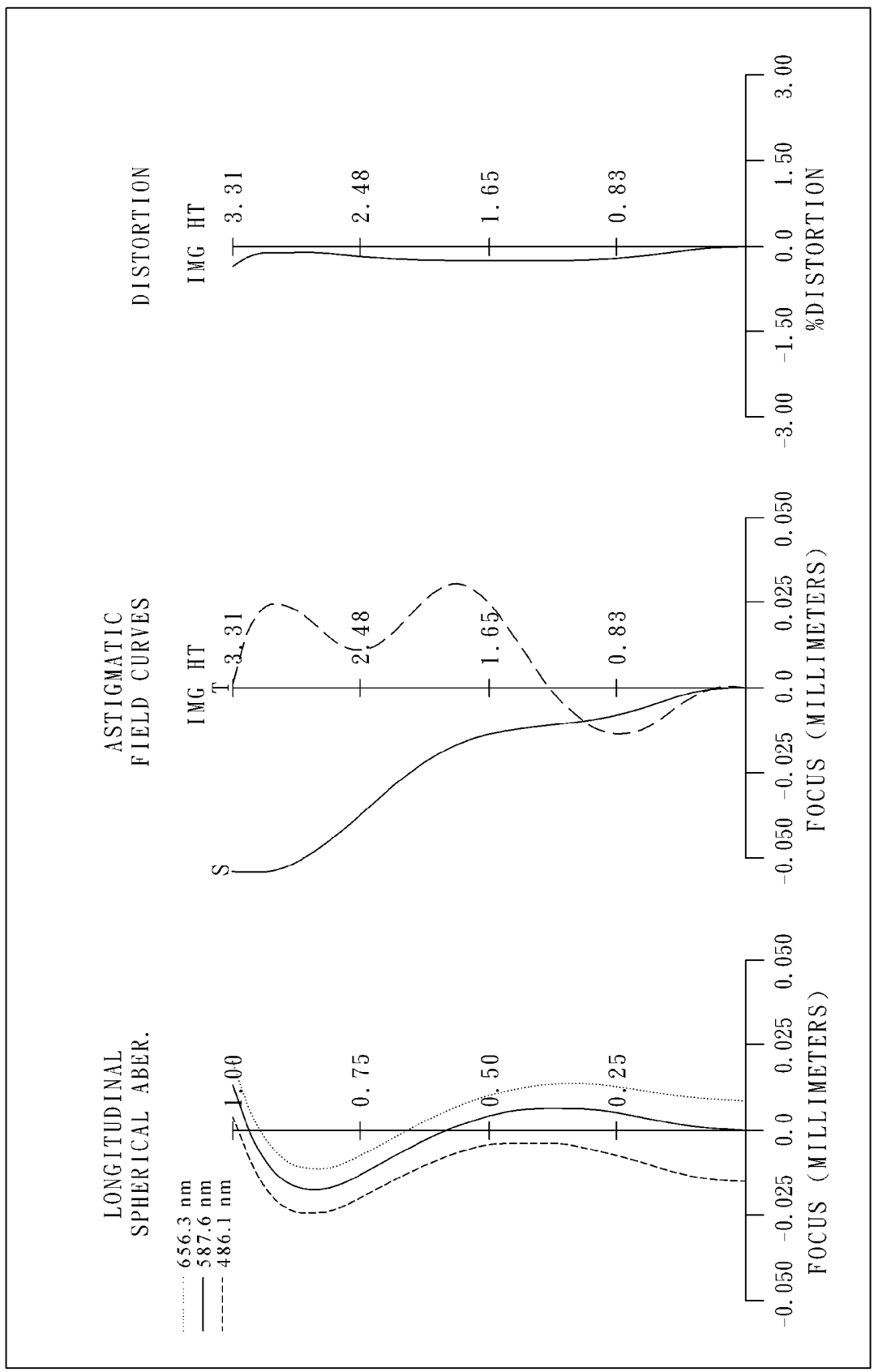
FIG. 5B shows the aberration curves of the fifth embodiment of the present invention.

FIG. 5A shows an image lens system in accordance with the fifth embodiment of the present invention, and FIG. 5B shows the aberration curves of the fifth embodiment of the present invention. The image lens system of the fifth embodiment of the present invention comprises four lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with negative refractive power having a concave object-side surface 521 and a convex image-side surface 522, the object-side and image-side surfaces 521 and 522 thereof being aspheric;

a third lens element 530 made of plastic with positive refractive power having a concave object-side surface 531 and a convex image-side surface 532, the object-side and image-side surfaces 531 and 532 thereof being aspheric; and a fourth lens element 540 made of plastic with negative refractive power having a convex object-side surface 541 and a concave image-side surface 542, the object-side and image-side surfaces 541 and 542 thereof being aspheric, and at least one inflection point is formed on both the object-side surface 541 and the image-side surface 542 thereof;

wherein an aperture stop 500 is disposed between an imaged object and the first lens element 510;

the image lens system further comprises an IR filter 550 disposed between the image-side surface 542 of the fourth lens element 540 and an image plane 570, and the IR filter 550 is made of glass and has no influence on the focal length of the image lens system; the image lens system further comprises an image sensor 560 provided on the image plane 570.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
f = 4.53 mm, Fno = 2.10, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.066 | | | | |
| 2 | Lens 1 | 7.520900 (ASP) | 1.318 | Plastic | 1.544 | 55.9 | 4.70 |
| 3 | | −3.640100 (ASP) | 0.654 | | | | |
| 4 | Lens 2 | −3.400100 (ASP) | 0.464 | Plastic | 1.633 | 23.4 | −6.27 |
| 5 | | −24.948000 (ASP) | 0.448 | | | | |
| 6 | Lens 3 | −3.520100 (ASP) | 1.364 | Plastic | 1.544 | 55.9 | 3.10 |
| 7 | | −1.294890 (ASP) | 0.165 | | | | |
| 8 | Lens 4 | 1.295440 (ASP) | 0.458 | Plastic | 1.633 | 23.4 | −5.30 |
| 9 | | 0.806590 (ASP) | 1.400 | | | | |
| 10 | IR-filter | Plano | 0.700 | Glass | 1.516 | 64.1 | — |
| 11 | | Plano | 0.580 | | | | |
| 12 | Image | Plano | — | | | | |

* Reference wavelength is 587.6 nm (d-line)

TABLE 13

| Aspheric Coefficients | | | | |
|---|---|---|---|---|
| Surface # | 2 | 3 | 4 | 5 |
| k = | 0.00000E+00 | 2.95947E+00 | −3.68387E−01 | −1.00000E+00 |
| A4 = | −1.65421E−02 | −1.94576E−02 | −7.41305E−02 | −4.15062E−02 |
| A6 = | −5.50289E−03 | −5.09766E−03 | 9.58616E−03 | 1.18259E−02 |
| A8 = | 1.31926E−03 | 4.19793E−03 | 5.30607E−03 | −1.23706E−03 |
| A10 = | −1.82771E−03 | −8.63245E−04 | −8.39040E−04 | −1.40272E−04 |
| A12 = | 5.58968E−06 | 3.65548E−05 | −8.71621E−06 | 3.65047E−05 |
| Surface # | 6 | 7 | 8 | 9 |
| k = | −1.47153E+00 | −2.96373E+00 | −3.35428E+00 | −2.79229E+00 |
| A4 = | 4.51132E−02 | −2.80401E−02 | −1.17165E−02 | −1.55523E−02 |
| A6 = | −4.95874E−02 | 9.83752E−04 | 2.26173E−04 | 1.53297E−03 |
| A8 = | 3.40970E−02 | 4.94203E−04 | 1.27366E−04 | 8.88517E−05 |
| A10 = | −1.56743E−02 | −1.06076E−04 | −1.62719E−06 | −7.82841E−05 |
| A12 = | 4.33836E−03 | −9.91701E−07 | −8.99993E−06 | 1.30724E−05 |
| A14 = | −6.55428E−04 | 2.22915E−06 | 1.59851E−06 | −1.00108E−06 |
| A16 = | 4.16042E−05 | | −9.12823E−08 | 2.89348E−08 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

| (Embodiment 5) | |
|---|---|
| f | 4.53 |
| FNO | 2.10 |
| HFOV | 36.3 |
| |N2−N4| | 0.00 |
| V3−V2 | 32.5 |
| T12/T23 | 1.46 |
| (R3 + R4)/(R3 − R4) | −1.32 |
| R7/f | 0.29 |
| f/f1 | 0.96 |
| f/f2 | −0.72 |
| f1/|f4| | 0.89 |
| f2/f4 | 1.18 |
| SAG22/CT2 | −0.58 |
| FOV | 72.6 deg |
| f/EPD | 2.10 |
| SD/TD | 1.01 |
| ImgH/TD | 0.68 |

Embodiment 6

Figure 6A:
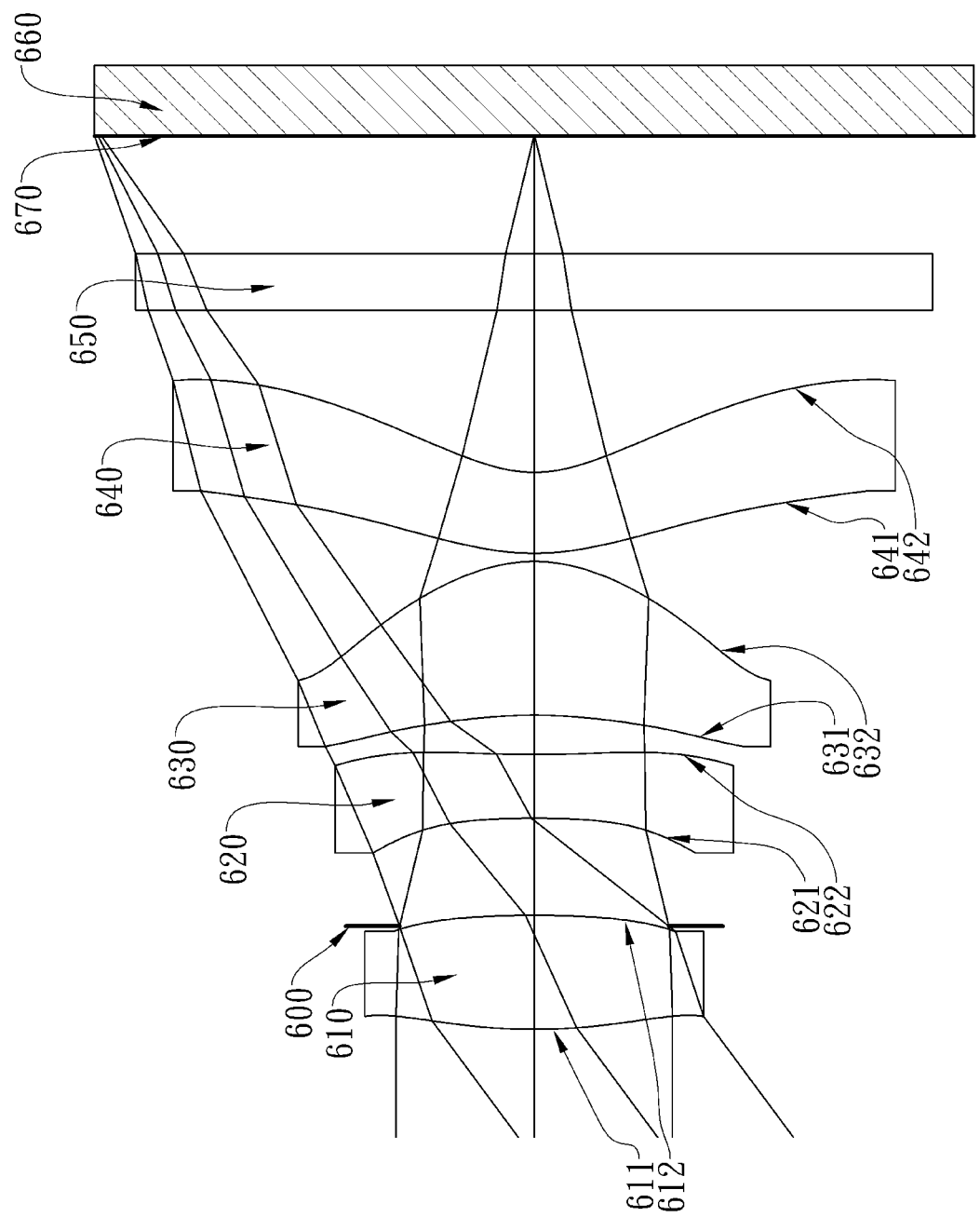
FIG. 6A shows an image lens system in accordance with a sixth embodiment of the present invention.
Figure 6B:
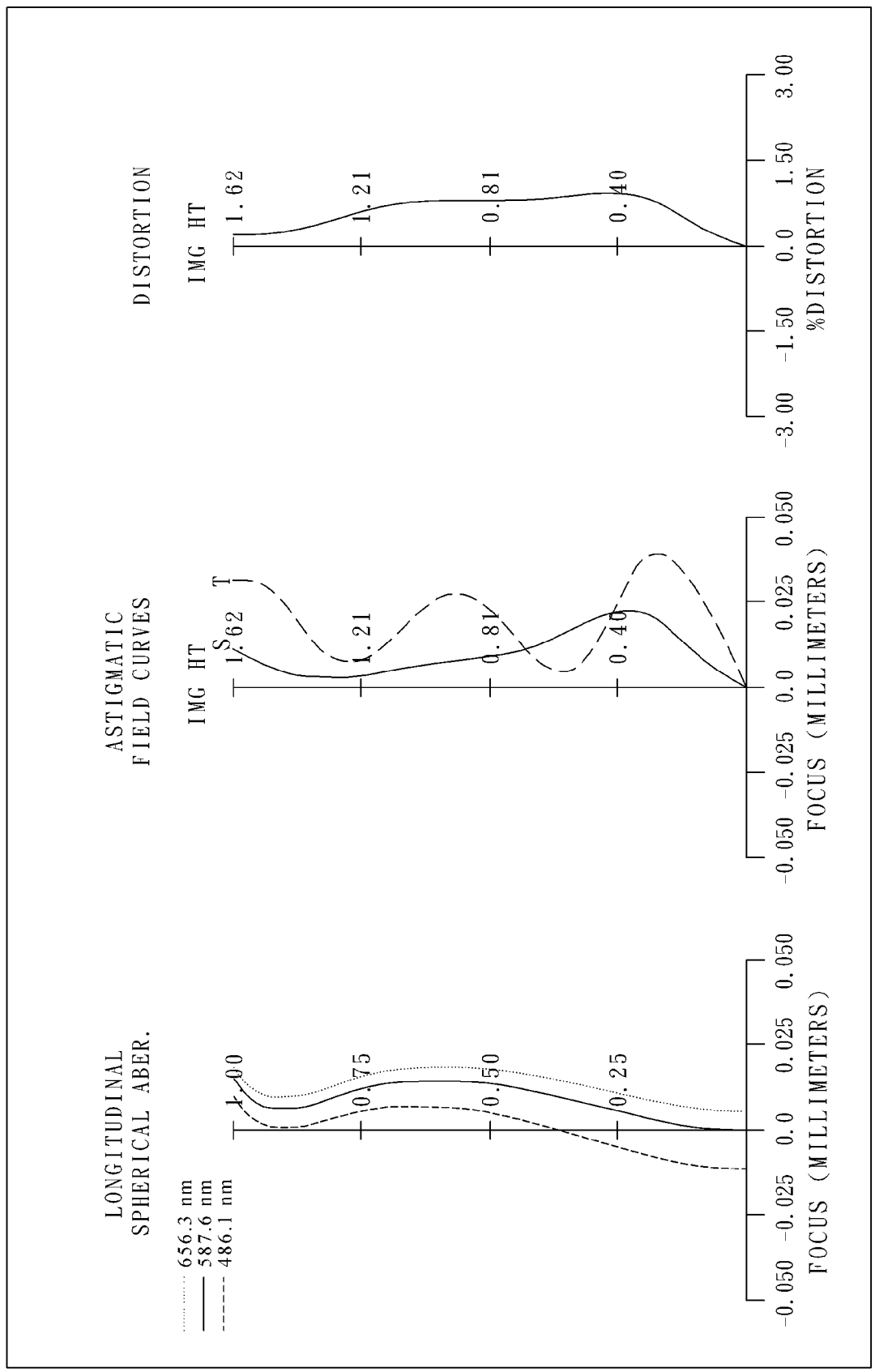
FIG. 6B shows the aberration curves of the sixth embodiment of the present invention.

FIG. 6A shows an image lens system in accordance with the sixth embodiment of the present invention, and FIG. 6B shows the aberration curves of the sixth embodiment of the present invention. The image lens system of the sixth embodiment of the present invention comprises four lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with negative refractive power having a concave object-side surface 621 and a concave image-side surface 622 near the optical axis, the object-side and image-side surfaces 621 and 622 thereof being aspheric; moreover, the off-axis region of the image-side surface 622 is changed to be convex;

a third lens element 630 made of plastic with positive refractive power having a concave object-side surface 631 and a convex image-side surface 632, the object-side and image-side surfaces 631 and 632 thereof being aspheric; and a fourth lens element 640 made of plastic with negative refractive power having a convex object-side surface 641 and a concave image-side surface 642, the object-side and image-side surfaces 641 and 642 thereof being aspheric, and at least one inflection point is formed on both the object-side surface 641 and the image-side surface 642 thereof;

wherein an aperture stop 600 is disposed between the first lens element 610 and the second lens element 620;

the image lens system further comprises an IR filter 650 disposed between the image-side surface 642 of the fourth lens element 640 and an image plane 670, and the IR filter 650 is made of glass and has no influence on the focal length of the image lens system; the image lens system further comprises an image sensor 660 provided on the image plane 670.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 2.17 mm, Fno = 2.12, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.040610 (ASP) | 0.422 | Plastic | 1.544 | 55.9 | 2.64 |
| 2 | | −4.527000 (ASP) | −0.040 | | | | |
| 3 | Ape. Stop | Plano | 0.400 | | | | |

TABLE 15-continued (Embodiment 6)
f = 2.17 mm, Fno = 2.12, HFOV = 36.5 deg.

| Surface # | | Curvature Radius | Thickness | Material | Index | Abbe # | Focal length |
|---|---|---|---|---|---|---|---|
| 4 | Lens 2 | −4.125600 (ASP) | 0.236 | Plastic | 1.640 | 23.3 | −3.16 |
| 5 | | 4.050300 (ASP) | 0.146 | | | | |
| 6 | Lens 3 | −1.827460 (ASP) | 0.570 | Plastic | 1.544 | 55.9 | 1.33 |
| 7 | | −0.574620 (ASP) | 0.030 | | | | |
| 8 | Lens 4 | 0.936340 (ASP) | 0.300 | Plastic | 1.544 | 55.9 | −2.30 |
| 9 | | 0.474950 (ASP) | 0.600 | | | | |
| 10 | IR-filter | Plano | 0.210 | Glass | 1.516 | 64.1 | — |
| 11 | | Plano | 0.436 | | | | |
| 12 | Image | Plano | — | | | | |

* Reference wavelength is 587.6 nm (d-line)

TABLE 16

Aspheric Coefficients

| Surface # | 1 | 2 | 4 | 5 |
|---|---|---|---|---|
| k = | −2.45472E+00 | −7.89932E+01 | −1.57621E+01 | −9.00000E+01 |
| A4 = | −9.96231E−02 | −4.43364E−01 | −8.75475E−01 | −3.03125E−01 |
| A6 = | −3.79695E−01 | 1.12442E−01 | 2.40491E−01 | −1.24266E−01 |
| A8 = | 3.93559E−01 | −1.09350E+00 | 4.00668E−01 | 2.79367E−01 |
| A10 = | −1.68411E+00 | 1.63327E+00 | −1.53224E−01 | |
| A12 = | | | 3.47448E+00 | |

| Surface # | 6 | 7 | 8 | 9 |
|---|---|---|---|---|
| k = | 4.02138E+00 | −4.16412E+00 | −6.55019E+00 | −4.11699E+00 |
| A4 = | 7.34575E−01 | −8.34436E−01 | −1.67469E−01 | −2.10292E−01 |
| A6 = | −3.82659E+00 | 1.73280E+00 | 1.33907E−01 | 1.85877E−01 |
| A8 = | 1.87624E+01 | −2.15010E+00 | −1.30106E−01 | −1.47742E−01 |
| A10 = | −6.38270E+01 | −4.48594E−01 | 1.36670E−01 | 7.61544E−02 |
| A12 = | 1.34030E+02 | 4.64090E+00 | −8.41445E−02 | −1.91329E−02 |
| A14 = | −1.48739E+02 | −2.78609E+00 | 2.50037E−02 | 3.93397E−04 |
| A16 = | 6.77632E+01 | −3.05097E−01 | −2.74831E−03 | 4.82787E−04 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f | 2.17 |
|---|---|
| FNO | 2.12 |
| HFOV | 36.5 |
| |N2-N4| | 0.10 |
| V3-V2 | 32.6 |
| T12/T23 | 2.47 |
| (R3 + R4)/(R3 − R4) | 0.01 |
| R7/f | 0.43 |
| f/f1 | 0.82 |
| f/f2 | −0.69 |
| f1/|f4| | 1.15 |
| f2/f4 | 1.37 |
| SAG22/CT2 | −0.17 |
| FOV | 72.6 deg |
| f/EPD | 2.12 |
| SD/TD | 0.82 |
| ImgH/TD | 0.78 |

Embodiment 7

Figure 7A:
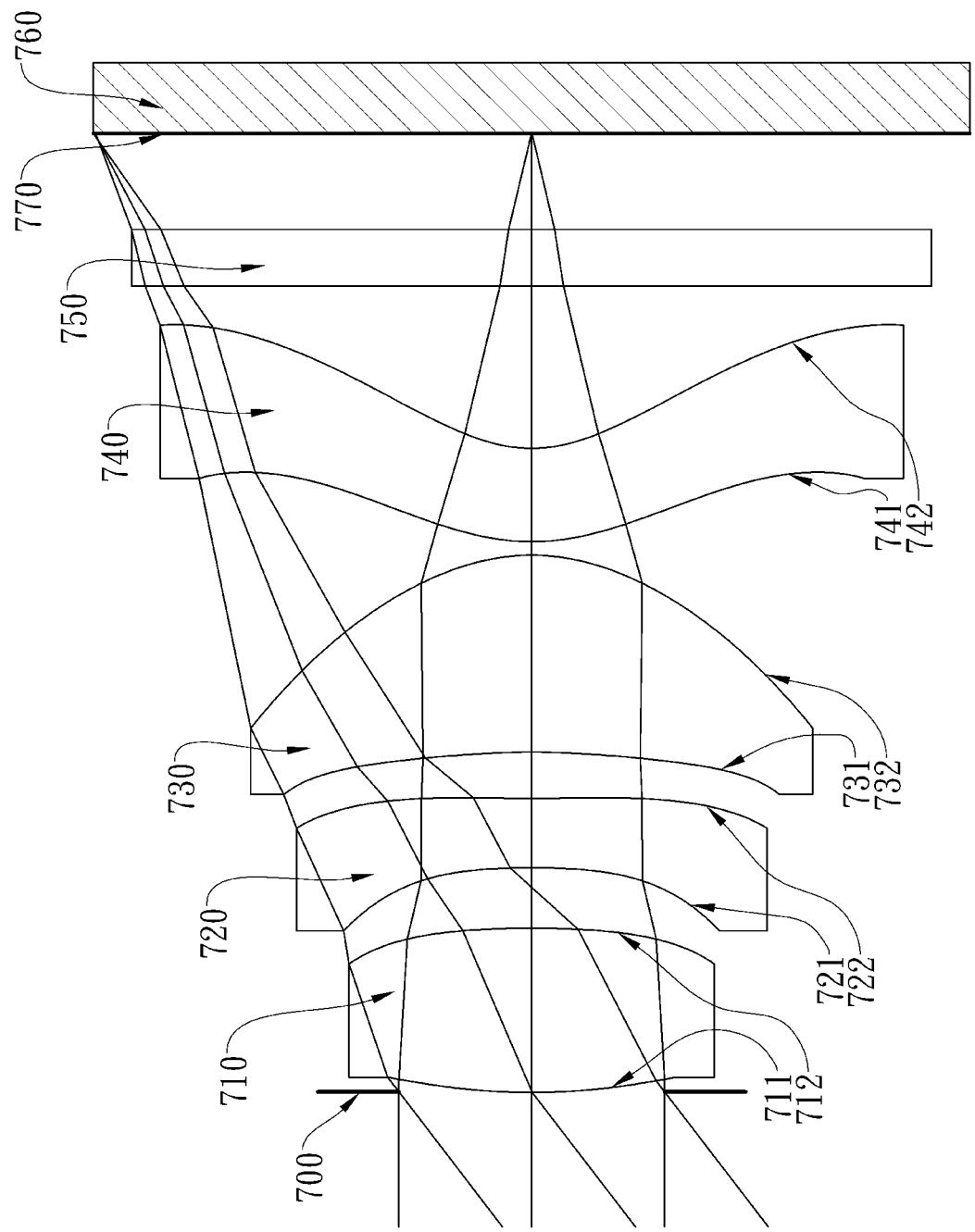
FIG. 7A shows an image lens system in accordance with a seventh embodiment of the present invention.
Figure 7B:
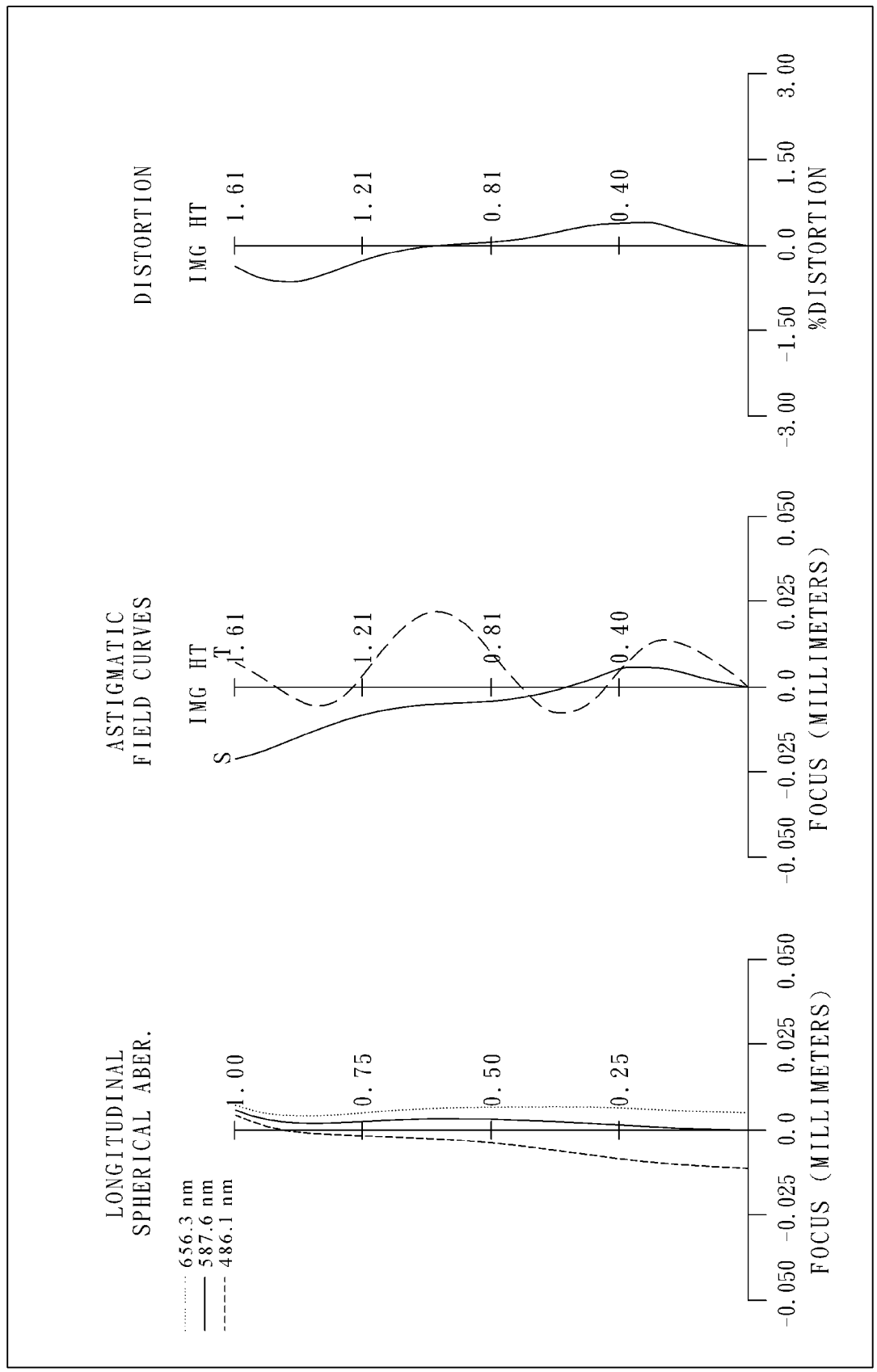
FIG. 7B shows the aberration curves of the seventh embodiment of the present invention.

FIG. 7A shows an image lens system in accordance with the seventh embodiment of the present invention, and FIG. 7B shows the aberration curves of the seventh embodiment of the present invention. The image lens system of the seventh embodiment of the present invention comprises four lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with negative refractive power having a concave object-side surface 721 and a concave image-side surface 722 near the optical axis, the object-side and image-side surfaces 721 and 722 thereof being aspheric; moreover, the off-axis region of the image-side surface 722 is changed to be convex;

a third lens element 730 made of plastic with positive refractive power having a concave object-side surface 731 and a convex image-side surface 732, the object-side and image-side surfaces 731 and 732 thereof being aspheric; and a fourth lens element 740 made of plastic with negative refractive power having a convex object-side surface 741 and a concave image-side surface 742, the object-side and image-side surfaces 741 and 742 thereof being aspheric, and at least one inflection point is formed on both the object-side surface 741 and the image-side surface 742 thereof;

wherein an aperture stop 700 is disposed between an imaged object and the first lens element 710;

the image lens system further comprises an IR filter 750 disposed between the image-side surface 742 of the fourth lens element 740 and an image plane 770, and the IR filter 750 is made of glass and has no influence on the focal length of the image lens system; the image lens system further comprises an image sensor 760 provided on the image plane 770.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 2.11 mm, Fno = 2.15, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.003 | | | | |
| 2 | Lens 1 | 2.254740 (ASP) | 0.608 | Plastic | 1.544 | 55.9 | 2.75 |
| 3 | | −4.033000 (ASP) | 0.224 | | | | |
| 4 | Lens 2 | −2.936040 (ASP) | 0.257 | Plastic | 1.640 | 23.3 | −3.54 |
| 5 | | 10.309300 (ASP) | 0.171 | | | | |
| 6 | Lens 3 | −2.743150 (ASP) | 0.729 | Plastic | 1.544 | 55.9 | 1.72 |
| 7 | | −0.762450 (ASP) | 0.050 | | | | |
| 8 | Lens 4 | 0.821460 (ASP) | 0.345 | Plastic | 1.640 | 23.3 | −3.62 |
| 9 | | 0.507100 (ASP) | 0.600 | | | | |
| 10 | IR-filter | Plano | 0.210 | Glass | 1.516 | 64.1 | — |
| 11 | | Plano | 0.355 | | | | |
| 12 | Image | Plano | — | | | | |

* Reference wavelength is 587.6 nm (d-line)

TABLE 19

Aspheric Coefficients

| Surface # | 2 | 3 | 4 | 5 |
|---|---|---|---|---|
| k = | 0.00000E+00 | 1.00000E+00 | 1.00000E+00 | −5.67407E+01 |
| A4 = | −6.18906E−02 | −2.69016E−01 | −7.32224E−01 | −3.71360E−01 |
| A6 = | −1.10117E−01 | −2.12778E−01 | 1.99377E−01 | 3.47303E−01 |
| A8 = | 2.90118E−01 | 3.75035E−01 | 3.33787E−02 | −2.31666E−01 |
| A10 = | −1.16965E+00 | −7.47006E−01 | −2.60534E−01 | −8.55759E−02 |
| A12 = | | | 3.65807E−01 | 7.95842E−02 |

| Surface # | 6 | 7 | 8 | 9 |
|---|---|---|---|---|
| k = | −5.20512E+00 | −2.81477E+00 | −2.83324E+00 | −2.68254E+00 |
| A4 = | 4.29941E−01 | −2.23265E−01 | −2.22591E−01 | −1.82116E−01 |
| A6 = | −1.96446E+00 | 4.92228E−02 | 7.90267E−02 | 7.88176E−02 |
| A8 = | 5.87768E+00 | 8.74707E−02 | −4.93118E−03 | 6.59884E−03 |
| A10 = | −1.17400E+01 | −9.28397E−02 | −1.15466E−02 | −5.47656E−02 |
| A12 = | 1.39559E+01 | −9.45564E−03 | −1.66726E−02 | 4.27195E−02 |
| A14 = | −9.15118E+00 | 2.84498E−02 | 2.37040E−02 | −1.41052E−02 |
| A16 = | 2.51867E+00 | | −7.53843E−03 | 1.71068E−03 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f | 2.11 |
|---|---|
| FNO | 2.15 |
| HFOV | 37.5 |

TABLE 20-continued (Embodiment 7)

| |N2−N4| | 0.00 |
|---|---|
| V3−V2 | 32.6 |
| T12/T23 | 1.31 |
| (R3 + R4)/(R3 − R4) | −0.56 |
| R7/f | 0.39 |
| f/f1 | 0.77 |
| f/f2 | −0.60 |
| f1/|f4| | 0.76 |

TABLE 20-continued (Embodiment 7)

| | |
|---|---|
| f2/f4 | 0.98 |
| SAG22/CT2 | −0.43 |
| FOV | 75.0 deg |
| f/EPD | 2.15 |
| SD/TD | 1.00 |
| ImgH/TD | 0.68 |

It is to be noted that TABLES 1-20 show different data of the different embodiments, however, the data of the different embodiments are obtained from experiments. Therefore, any image lens system of the same structure is considered to be within the scope of the present invention even if it uses different data. The embodiments depicted above and the appended drawings are exemplary and are not intended to limit the scope of the present invention.

What is claimed is:

1. An image lens system, in order from an object side to an image side comprising four lens elements with refractive power:
a first lens element with positive refractive power having a convex object-side surface and a convex image-side surface;
a second lens element with negative refractive power having a concave object-side surface and a concave image-side surface, both the object-side and image-side surfaces thereof being aspheric, and made of plastic;
a third lens element with positive refractive power having a concave object-side surface and a convex image-side surface, both the object-side and image-side surfaces thereof being aspheric, and made of plastic; and
a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof;
wherein the region of the image-side surface of the second lens element near the optical axis is concave, but the off-axis region of the image-side surface of the second lens element is convex;
wherein a focal length of the first lens element is f1, a focal length of the fourth lens element is f4, an axial distance between the first lens element and the second lens element is T12, an axial distance between the second lens element and the third lens element is T23, and they satisfy the following relations:

$0.6<|f1/f4|<1.4$; and $1.0<T12/T23<4.5$.

2. The image lens system according to claim 1, a focal length of the image lens system is f, the focal length of the first lens element is f1, and they satisfy the following relation:

$0.5<f/f1<1.25$.

3. The image lens system according to claim 2, wherein a curvature radius of the object-side surface of the second lens element is R3, a curvature radius of the image-side surface of the second lens element is R4, and they satisfy the following relation:

$-1.0<(R3+R4)/(R3-R4)<0.5$.

4. The image lens system according to claim 3, wherein a focal length of the second lens element is f2, the focal length of the fourth lens element is f4, and they satisfy the following relation:

$0.75<f2/f4<1.5$.

5. The image lens system according to claim 3, wherein an Abbe number of the third lens element is V3, an Abbe number of the second lens element is V2, and they satisfy the following relation:

$30<V3-V2<42$.

6. The image lens system according to claim 3, wherein the axial distance between the first lens element and the second lens element is T12, the axial distance between the second lens element and the third lens element is T23, and they satisfy the following relation:

$1.3<T12/T23<4.0$.

7. The image lens system according to claim 3, further comprising a stop, an axial distance between the stop and the image-side surface of the fourth lens element is SD, an axial distance between the object-side surface of the first lens element and the image-side surface of the fourth lens element is TD, and they satisfy the following relation:

$0.70<SD/TD<0.90$.

8. The image lens system according to claim 1, wherein a horizontal distance between a maximal effective diameter position on the image-side surface of the second lens element and an apex of the image-side surface of the second lens element on the optical axis is SAG22, a central thickness of the second lens element is CT2, and they satisfy the following relation:

$-1.5<SAG22/CT2<0$.

9. The image lens system according to claim 1, a focal length of the image lens system is f, an entrance pupil diameter of the image lens system is EPD, and they satisfy the following relation:

$1.6<f/EPD<2.4$.

10. The image lens system according to claim 1, wherein a maximal field of view of the system is FOV, and it satisfies the following relation:

70 degree<FOV<90 degree.

11. The image lens system according to claim 3, a maximal image height of the image lens system is ImgH, an axial distance between the object-side surface of the first lens element and the image-side surface of the fourth lens element is TD, and they satisfy the following relation:

$0.50<ImgH/TD<0.85$.

12. An image lens system, in order from an object side to an image side comprising four lens elements with refractive power:
a first lens element with positive refractive power having a convex object-side surface and a convex image-side surface;
a second lens element with negative refractive power having a concave object-side surface, both the object-side and image-side surfaces thereof being aspheric, and made of plastic;
a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof;

wherein a focal length of the first lens element is f1, a focal length of the fourth lens element is f4, an axial distance between the first lens element and the second lens element is T12, an axial distance between the second lens element and the third lens element is T23, a focal length of the image lens system is f, a focal length of the second lens element is f2, an entrance pupil diameter of the image lens system is EPD, and they satisfy the following relations:

$0.6 < |f1/f4| < 1.4$;

$1.3 < T12/T23 < 4.0$;

$-0.9 < f/f2 < -0.4$; and $1.6 < f/EPD < 2.4$.

13. The image lens system according to claim 12, a maximal image height of the image lens system is ImgH, an axial distance between the object-side surface of the first lens element and the image-side surface of the fourth lens element is TD, and they satisfy the following relation:

$0.50 < ImgH/TD < 0.85$.

14. The image lens system according to claim 13, wherein a curvature radius of the object-side surface of the fourth lens element is R7, the focal length of the image lens system is f, and they satisfy the following relation:

$0.1 < R7/f < 0.8$.

15. The image lens system according to claim 12, further comprising a stop, an axial distance between the stop and the image-side surface of the fourth lens element is SD, an axial distance between the object-side surface of the first lens element and the image-side surface of the fourth lens element is TD, and they satisfy the following relation:

$0.70 < SD/TD < 0.90$.

16. The image lens system according to claim 12, wherein the region of the image-side surface of the second lens element near the optical axis is concave, but the off-axis region of the image-side surface of the second lens element is convex.

17. An image lens system, in order from an object side to an image side comprising four lens elements with refractive power:

a first lens element with positive refractive power having a convex object-side surface and a convex image-side surface;

a second lens element with negative refractive power having a concave object-side surface and a concave image-side surface, both the object-side and image-side surfaces thereof being aspheric, and made of plastic;

a third lens element with positive refractive power having a concave object-side surface and a convex image-side surface, both the object-side and image-side surfaces thereof being aspheric, and made of plastic; and a fourth lens element with negative refractive power having a convex object-side surface and a concave image-side surface, both the object-side and image-side surfaces thereof being aspheric, made of plastic, and at least one inflection point is formed on at least one of the object-side and image-side surfaces thereof;

wherein a focal length of the second lens element is f2, a focal length of the fourth lens element is f4, an axial distance between the first lens element and the second lens element is T12, an axial distance between the second lens element and the third lens element is T23, a curvature radius of the object-side surface of the fourth lens element is R7, a focal length of the image lens system is f, a refractive index of the second lens element is N2, a refractive index of the fourth lens element is N4, and they satisfy the following relations:

$0.75 < f2/f4 < 1.5$;

$1.0 < T12/T23 < 4.5$;

$0.1 < R7/f < 0.8$; and $|N2-N4| < 0.18$.

18. The image lens system according to claim 17, further comprising a stop, an axial distance between the stop and the image-side surface of the fourth lens element is SD, an axial distance between the object-side surface of the first lens element and the image-side surface of the fourth lens element is TD, and they satisfy the following relation:

$0.70 < SD/TD < 0.90$.

19. The image lens system according to claim 18, a maximal image height of the image lens system is ImgH, an axial distance between the object-side surface of the first lens element and the image-side surface of the fourth lens element is TD, and they satisfy the following relation:

$0.50 < ImgH/TD < 0.85$.

20. The image lens system according to claim 19, wherein a horizontal distance between a maximal effective diameter position on the image-side surface of the second lens element and an apex of the image-side surface of the second lens element on the optical axis is SAG22, a central thickness of the second lens element is CT2, and they satisfy the following relation:

$-1.5 < SAG22/CT2 < 0$.

21. The image lens system according to claim 17, a focal length of the image lens system is f, an entrance pupil diameter of the system is EPD, and they satisfy the following relation:

$1.6 < f/EPD < 2.4$.

22. The image lens system according to claim 17, wherein the region of the image-side surface of the second lens element near the optical axis is concave, but the off-axis region of the image-side surface of the second lens element is convex.

* * * * *